(12) United States Patent
Liu et al.

(10) Patent No.: US 11,294,151 B2
(45) Date of Patent: Apr. 5, 2022

(54) OPTICAL IMAGING LENS, CAMERA MODULE AND MOBILE PHONE

(71) Applicant: JIANGXI LIANYI OPTICS CO., LTD., Nanchang (CN)

(72) Inventors: Xuming Liu, Nanchang (CN); Haojie Zeng, Nanchang (CN); Tian Zhang, Nanchang (CN); Jiyong Zeng, Nanchang (CN)

(73) Assignee: JIANGXI LIANYI OPTICS CO., LTD., Nanchang (CN)

( * ) Notice: Subject to any disclaimer, the term of this patent is extended or adjusted under 35 U.S.C. 154(b) by 230 days.

(21) Appl. No.: 16/858,581

(22) Filed: Apr. 25, 2020

(65) Prior Publication Data

US 2020/0257087 A1    Aug. 13, 2020

Related U.S. Application Data

(63) Continuation of application No. PCT/CN2019/116133, filed on Nov. 7, 2019.

(30) Foreign Application Priority Data

Jan. 2, 2019   (CN) .......................... 201910000729.1

(51) Int. Cl.
*H04N 5/225*   (2006.01)
*G02B 9/64*    (2006.01)
(Continued)

(52) U.S. Cl.
CPC ........... *G02B 13/0045* (2013.01); *G02B 9/64* (2013.01); *H04M 1/0264* (2013.01);
(Continued)

(58) Field of Classification Search
CPC .. H04N 5/2254; H04N 5/2257; H04N 5/2258; H04M 1/0264; G02B 9/64; G02B 13/0045
(Continued)

(56) References Cited

U.S. PATENT DOCUMENTS 4,597,641 A    7/1986  Arai
2019/0121065 A1*  4/2019  Wenren ................... G02B 7/04
(Continued)

FOREIGN PATENT DOCUMENTS

CN    204028445 U    12/2014
CN    106950631 A    7/2017
(Continued)

OTHER PUBLICATIONS

Fitst Office Action issued in corresponding Chinese application No. 201910000729.1 dated Feb. 22, 2019(8 pages).
(Continued)

*Primary Examiner* — Anthony J Daniels

(57) ABSTRACT

The disclosure provides an optical imaging lens, a camera module and a mobile phone. The optical imaging lens sequentially includes: a first lens having a positive refractive power, a convex object side surface and a concave image side surface; a second lens with a negative refractive power; a third lens with a positive refractive power; a fourth lens with a negative refractive power, wherein an object side surface of the fourth lens is concave at the paraxial region, and an image side surface of the fourth lens is convex at the paraxial region; a fifth lens with a negative refractive power, an image side surface of the fifth lens being concave at the paraxial region; a sixth lens with a positive refractive power; and a seventh lens with a negative refractive power.

20 Claims, 12 Drawing Sheets

(51) Int. Cl.
G02B 13/00 (2006.01)
H04M 1/02 (2006.01)

(52) U.S. Cl.
CPC ......... *H04N 5/2252* (2013.01); *H04N 5/2254* (2013.01); *H04M 2250/52* (2013.01)

(58) Field of Classification Search
USPC ........................................................ 348/335
See application file for complete search history.

(56) References Cited

U.S. PATENT DOCUMENTS

| | | | | |
|---|---|---|---|---|
| 2021/0003829 A1* | 1/2021 | Dai | .......................... | G02B 9/64 |
| 2021/0048611 A1* | 2/2021 | Jung | ........................ | G02B 9/64 |
| 2021/0173183 A1* | 6/2021 | Ye | ............................ | G02B 9/64 |

FOREIGN PATENT DOCUMENTS

| | | |
|---|---|---|
| CN | 206594355 U | 10/2017 |
| CN | 107817501 A | 3/2018 |
| CN | 109324398 A | 2/2019 |
| JP | 2017156570 A | 9/2017 |

OTHER PUBLICATIONS

International Search Report issued in corresponding International application No. PCT/CN2019/116133, dated Jan. 31, 2020(8 pages).
Written opinion of International Search Authority issued in corresponding international application No. PCT/CN2019/116133, dated Jan. 31, 2020(5 pages).

* cited by examiner $CT_{4-i}$

"OPTICAL IMAGING LENS, CAMERA MODULE AND MOBILE PHONE"

CROSS REFERENCE TO RELATED APPLICATION(S)

This application is a continuation of International Application No. PCT/CN2019/116133, filed on Nov. 7, 2019, titled "OPTICAL IMAGING LENS AND IMAGING DEVICE". This International Application No. PCT/CN2019/116133 claims priority to a Chinese application No. 2019100007291, filed on Jan. 2, 2019, titled "OPTICAL IMAGING LENS AND IMAGING DEVICE". The entirety of the above-mentioned application is hereby incorporated by reference herein.

TECHNICAL FIELD

The disclosure relates to the field of optical camera lens technologies, and more particularly, to an optical imaging lens, an imaging device, a camera module and a mobile phone.

BACKGROUND

At present, camera lenses have become standard equipment for electronic devices, such as smart phones and cameras. The performance of the camera lens has even become the primary factor for consumers when purchasing the electronic device. In recent years, with the continuous development of design level and manufacturing technology, the camera lenses are developing towards the direction of small size, light weight and high performance.

However, the conventional camera lens equipped on a portable electronic device can meet the miniaturization requirements, but due to a relatively large F number it can not ensure the imaging quality of the camera lens under dim light conditions.

SUMMARY

In view of the above problems, the disclosure provides an optical imaging lens, an imaging device, a camera module and a mobile phone, each having the advantages of large aperture and high imaging quality.

In a first aspect, an embodiment of the disclosure provides an optical imaging lens. From an object side to an image side along an optical axis, the optical imaging lens sequentially includes: a first lens with a positive refractive power, wherein an object side surface of the first lens is convex, an image side surface of the first lens is concave, the first lens is a glass aspheric lens; a second lens with a negative refractive power; a third lens with a positive refractive power; a fourth lens with a negative refractive power, wherein an object side surface of the fourth lens is concave at the paraxial region, and an image side surface of the fourth lens is convex at the paraxial region; a fifth lens with a negative refractive power, an image side surface of the fifth lens being concave at the paraxial region; a sixth lens with a positive refractive power; a seventh lens with a negative refractive power, an object side surface and an image side surface of the seventh lens both being concave at the paraxial region:
wherein the optical imaging lens meets the expressions:
$0.7<CT_{4-i}/CT_4<1.2$; $0.7<CT_{5-i}/CT_5<1.2$; $1.0<f_1/f<1.5$; where $CT_{4-i}$ represents a thickness of the fourth lens at any position in the normal direction, $CT_{5-i}$ represents a thickness of the fifth lens at any position in the normal direction, $CT_4$ represents a center thickness of the fourth lens, $CT_5$ represents a center thickness of the fifth lens; $f_1$ represents a focal length of the first lens, f represents a focal length of the optical imaging lens.

Further, the optical imaging lens meets the expression: $25<(R_9/CT_5)+(R_{10}/CT_5)<35$; where $R_9$ represents a radius of curvature of an object side surface of the fifth lens, $R_{10}$ represents a radius of curvature of the image side surface of the fifth lens, $CT_5$ represents a center thickness of the fifth lens.

Further, the optical imaging lens meets the expression: $0<R_7/R_8<0.5$; where $R_7$ represents a radius of curvature of the object side surface of the fourth lens, $R_8$ represents a radius of curvature of the image side surface of the fourth lens.

Further, the optical imaging lens meets the expression: $5.0<(T_{12}/T_{23})+(T_{34}/T_{45})+(T_{56}/T_{67})<7.0$; where $T_{12}$ represents a distance between the first lens and the second lens on the optical axis, $T_{23}$ represents a distance between the second lens and the third lens on the optical axis, $T_{34}$ represents a distance between the third lens and the fourth lens on the optical axis, $T_{45}$ represents a distance between the fourth lens and the fifth lens on the optical axis, $T_{56}$ represents a distance between the fifth lens and the sixth lens on the optical axis, $T_{67}$ represents a distance between the sixth lens and the seventh lens on the optical axis.

Further, the optical imaging lens meets the expression: $1.0<Td/ImgH<1.5$; where Td represents a distance between the object side surface of the first lens and the image side surface of the seventh lens on the optical axis, ImgH represents a half image height of the optical imaging lens on an imaging surface.

Further, the optical imaging lens meets the expression: $0<f_5/f_4<10$; where $f_4$ represents a focal length of the fourth lens, $f_5$ represents a focal length of the fifth lens.

Further, the second lens, the third lens, the fourth lens, the fifth lens, the sixth lens and the seventh lens each are plastic aspheric lenses.

Further, the optimal imaging lens includes: a stop disposed at an object side of the first lens, and a filter disposed between the seventh lens and the imaging surface.

In a second aspect, an embodiment of the disclosure provides an imaging device, which includes the optical imaging lens described above and an imaging component configured for converting an optical image formed by the optical imaging lens into electrical signals.

In a third aspect, the disclosure provides a camera module, which includes the optical imaging lens described above, a barrel, a holder and an image sensor. The optical imaging lens is received in the barrel, and the barrel is engaged with the holder. The image sensor is substantially accommodated in the holder and opposite to the optical imaging lens. The image sensor is configured for converting light signals into electrical signals, thereby the images formed by the optical imaging lens can be converted and transmitted to a processor.

In a fourth aspect, the disclosure provides a mobile phone, including the camera module as described above.

By appropriately setting the shape and the refractive power of every lens and the combination, the optical imaging lens, the imaging device, the camera module, and the mobile phone provided by the embodiments of the disclosure effectively reduce the overall size of the optical imaging lens, and achieve clear imaging effect with large aperture while achieving miniaturization, so they has the advantages of miniaturization, large aperture and high imaging quality, has good applicability to portable electronic devices, and can effectively improve the user's shooting experience.

These or other aspects of the disclosure will become apparent and understandable in the description of the following embodiments.

BRIEF DESCRIPTION OF THE DRAWINGS

In order to explain the technical solutions in the embodiments of the disclosure more clearly, the drawings used in the description of the embodiments are briefly introduced below. Obviously, the following drawings just illustrate some embodiments of the disclosure. For those skilled in the art, other drawings can be obtained based on these drawings without creative work.

Figure 1:
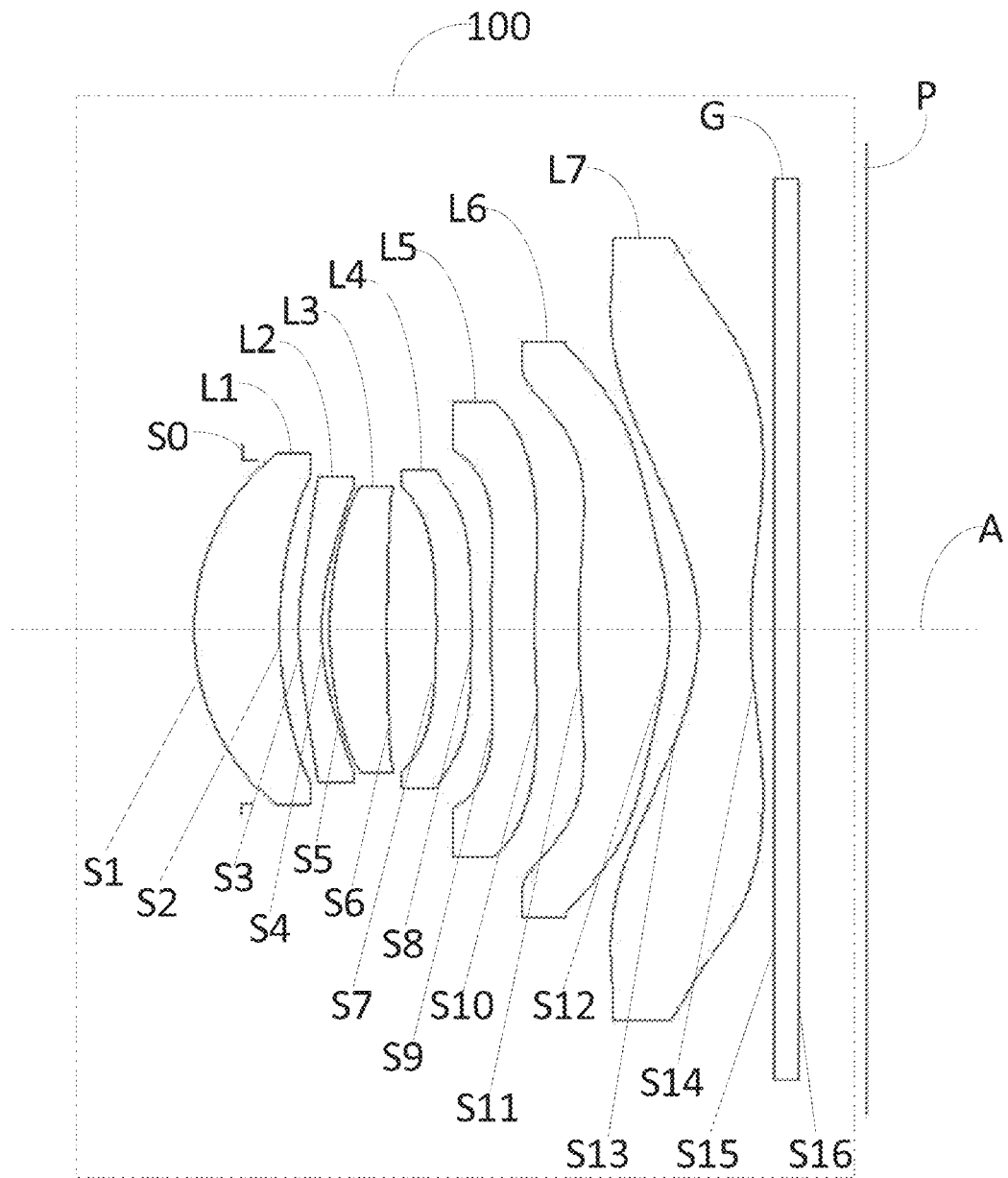
FIG. 1 is a schematic structural diagram of an optical imaging lens according to a first embodiment of the disclosure.

Reference numerals: S0—stop; L1—first lens; L2—second lens; L3—third lens; L4—fourth lens; L5—fifth lens; L6—sixth lens; L7—seventh lens; G—filter Light sheet; P—imaging surface; A—optical axis; S1—object side surface of the first lens; S2—image side surface of the first lens; S3—object side surface of the second lens; S4—image side surface of the second lens; S5—object side surface of the third lens; S6—image side surface of the third lens; S7—object side surface of the fourth lens; S8—image side surface of the fourth lens; S9—object side surface of the fifth lens; S10—image side surface of the fifth lens; S11—object side surface of the sixth lens; S12—image side surface of the sixth lens; S13—object side surface of the seventh lens; S14—image side surface of the seventh lens; S15—object side surface of the filter; S16—image side surface of the filter; 100—optical imaging lens; 200—imaging component; 1000—imaging device; 300—camera module; 301—barrel; 302—holder; 303—image sensor; 304—printed circuit board; 400, 500—mobile phone, 401—processor; 402—memory; 403—housing; 404—display screen; 405—front surface; 506—rear surface.

DETAILED DESCRIPTION OF PREFERRED EMBODIMENTS

Hereinafter, embodiments of the disclosure will be described in detail. Examples of the embodiments are illustrated in the drawings, wherein the same or similar reference numerals represent the same or similar elements or elements having the same or similar functions. The embodiments described below with reference to the drawings are exemplary and are only used to explain the disclosure, but should not be construed to limit the disclosure.

At present, with the popularity of portable electronic devices, such as smart phones and cameras, and the popularity of social, video, and live-streaming software, people are becoming more and more interested in photography, camera lenses have become standard equipment for electronic devices, and the performance of the camera lens has even become the first factor for consumers to consider when purchasing electronic devices. In recent years, camera lenses have evolved toward small size, light weight, and high performance.

However, the inventors found the following two aspects in the research on the conventional camera lenses. On the one hand, people's requirements for image quality are gradually increasing, and the size of the chip is increased accordingly, resulting in the volume of the camera lens becoming larger. This makes it difficult for the camera lens to develop toward miniaturization while ensuring imaging quality.

On the other hand, the conventional portable electronic devices are mostly used for shooting portraits or close shots, which also proposes higher requirements on the sharpness of the imaging lens. It is generally known that, the larger the aperture of the camera lens, the greater the amount of input light, which can effectively increase the shutter speed, meanwhile improve the background blur effect and the imaging quality when shooting in dim environments. However, the F number of the camera lenses currently equipped on the portable electronic devices is generally larger than 2.0. Although such camera lenses can meet the requirements of miniaturization, they cannot ensure the imaging quality of the camera lenses under insufficient light conditions.

In order to solve the above problems, after research, the inventors propose an optical imaging lens, an imaging device, a camera module and a mobile phone of the embodiments of the disclosure, which have the advantages of miniaturization, large aperture, and high imaging quality.

In order to enable those skilled in the art to better understand the solutions of the disclosure, the technical solutions in the embodiments of the disclosure will be clearly and completely described below with reference to the accompanying drawings in the embodiments of the disclosure. Obviously, the described embodiments are only some embodiments but not all embodiments of the disclosure. Based on the embodiments of the disclosure, all other embodiments obtained by those skilled in the art without making creative work fall into the protection scope of the disclosure.

Embodiment 1

Please refer to FIG. 1, FIG. 1 is a schematic structural diagram of an optical imaging lens 100 provided by a first embodiment of the disclosure.

In this embodiment, as illustrated in FIG. 1, from an object side to an image side along an optical axis, the optical imaging lens 100 sequentially includes a first lens L1, a second lens L2, a third lens L3, a fourth lens L4, a fifth lens L5, a sixth lens L6 and a seventh lens L7.

The first lens L1 has a positive refractive power, an object side surface S1 of the first lens L1 is convex, an image side surface S2 of the first lens L1 is concave.

The second lens L2 has a negative refractive power, which can effectively reconcile the aberrations generated by the first lens L1, and can also control the focusing ability of the working band.

The third lens L3 has a positive refractive power.

The fourth lens L4 has a negative refractive power, an object side surface S7 of the fourth lens L4 is concave at the paraxial region, and an image side surface S8 of the fourth lens L4 is convex at the paraxial region.

The fifth lens L5 has a negative refractive power, an image side surface S10 of the fifth lens L5 is concave at the paraxial region.

The sixth lens L6 has a positive refractive power.

The seventh lens L7 has a negative refractive power, an object side surface S13 and an image side surface S14 of the seventh lens L7 are both concave at the paraxial region, which can effectively correct the aberrations of the optical imaging lens 100, thereby effectively controlling the angle of light exit.

As an embodiment, the first lens L1 can be a glass aspherical lens, by which the incident light beams from a light source can be converged, and sufficient positive refractive power can be provided to effectively control the overall size of the optical imaging lens 100. In addition, the glass material can effectively improve the imaging resolution of the optical imaging lens 100.

Further, in some embodiments, the second lens L2, the third lens L3, the fourth lens L4, the fifth lens L5, the sixth lens L6 and the seventh lens L7 each can be plastic aspheric lenses, and the plastic material can effectively reduce the production cost.

As illustrated in FIG. 1, in this embodiment, the optical imaging lens 100 may also include a stop S0 disposed at an object side of the first lens L1 and a filter G disposed between the seventh lens L7 and an imaging surface P. The filter G can be used to selectively filter some light, so as to optimize the imaging effect.

In this embodiment, the imaging surface P can be a plane where light incident from the object side and passed through the optical imaging lens 100 is clearly imaged at the image side.

Figure 2:
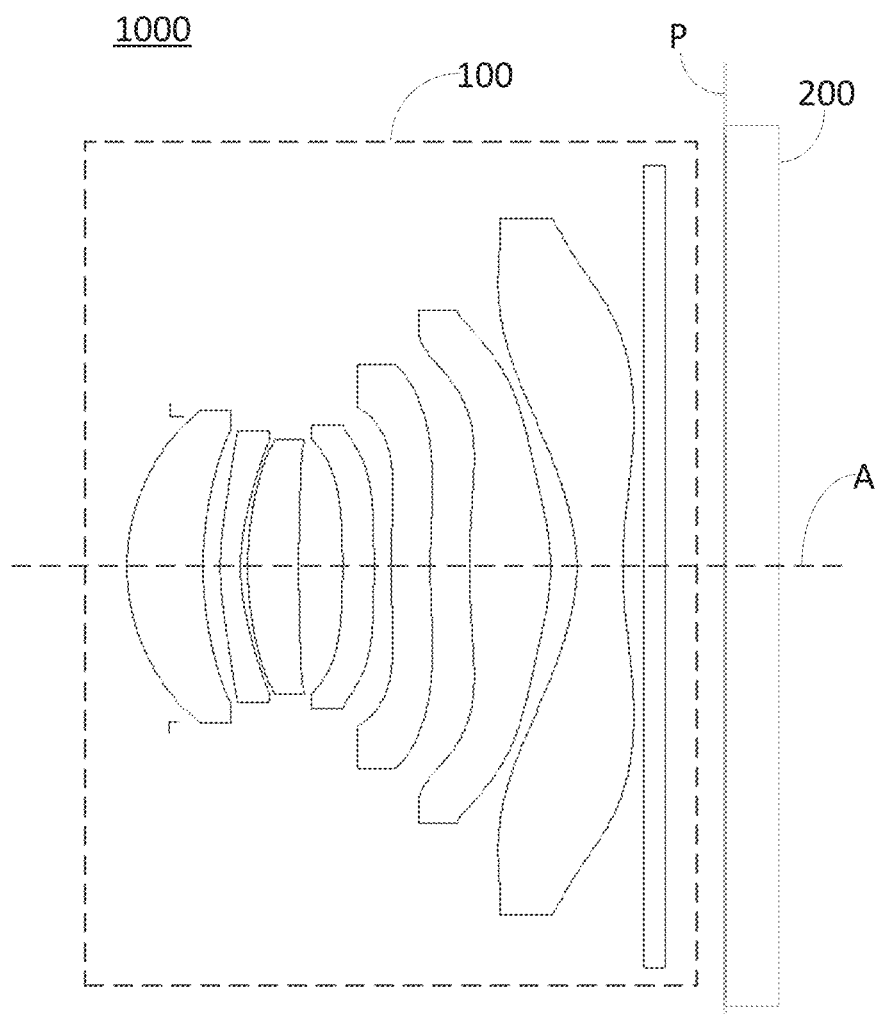
FIG. 2 is a schematic structural diagram of an imaging device according to a first embodiment of the disclosure.
Figure 3:
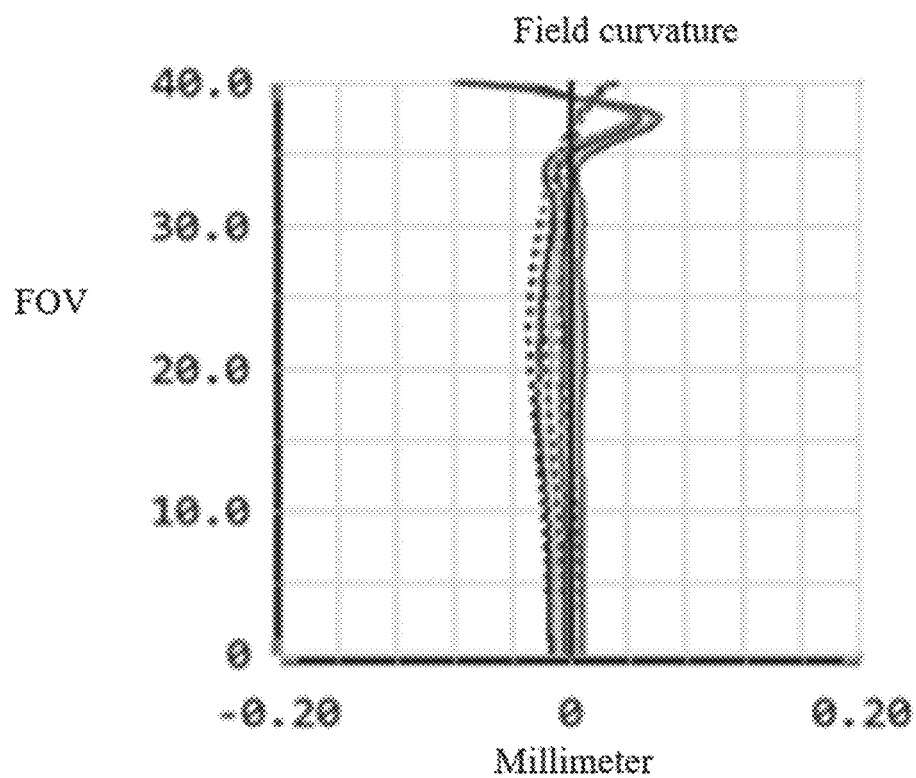
FIG. 3 is a diagram showing field curvature curves of the optical imaging lens according to the first embodiment of the disclosure.
Figure 4:
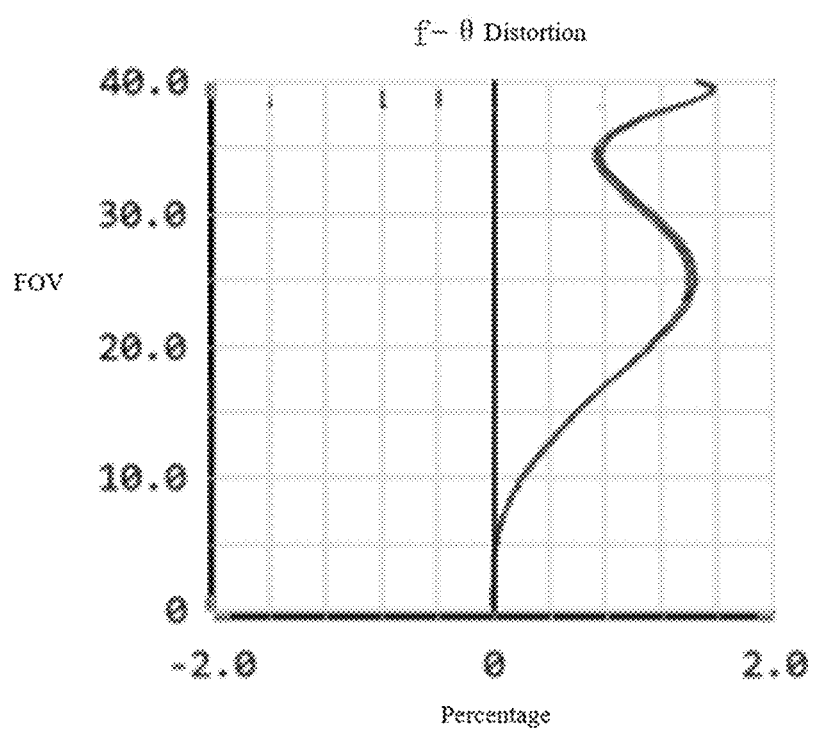
FIG. 4 is a diagram showing distortion curves of the optical imaging lens according to the first embodiment of the disclosure.
Figure 5:
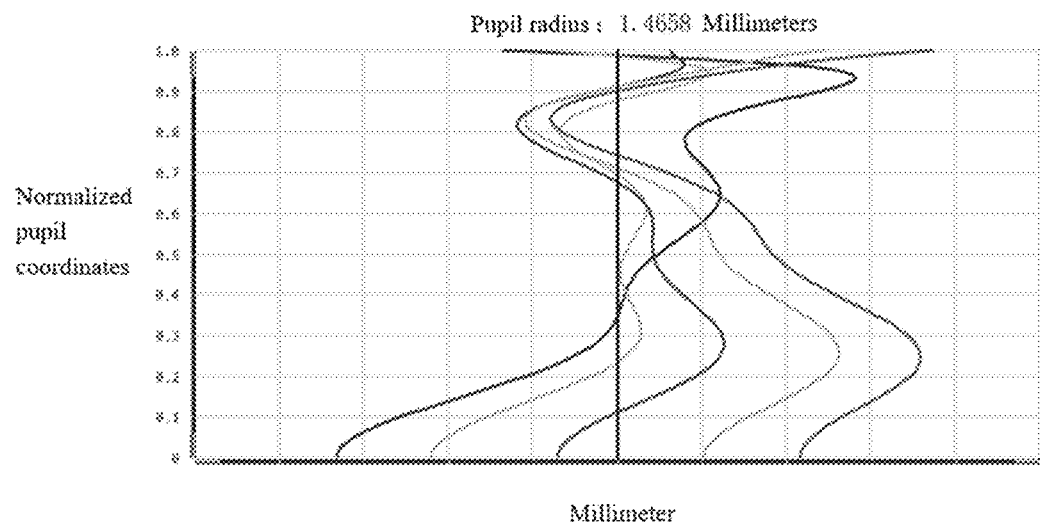
FIG. 5 is a diagram showing axial spherical aberration curves of the optical imaging lens according to the first embodiment of the disclosure.
Figure 6:
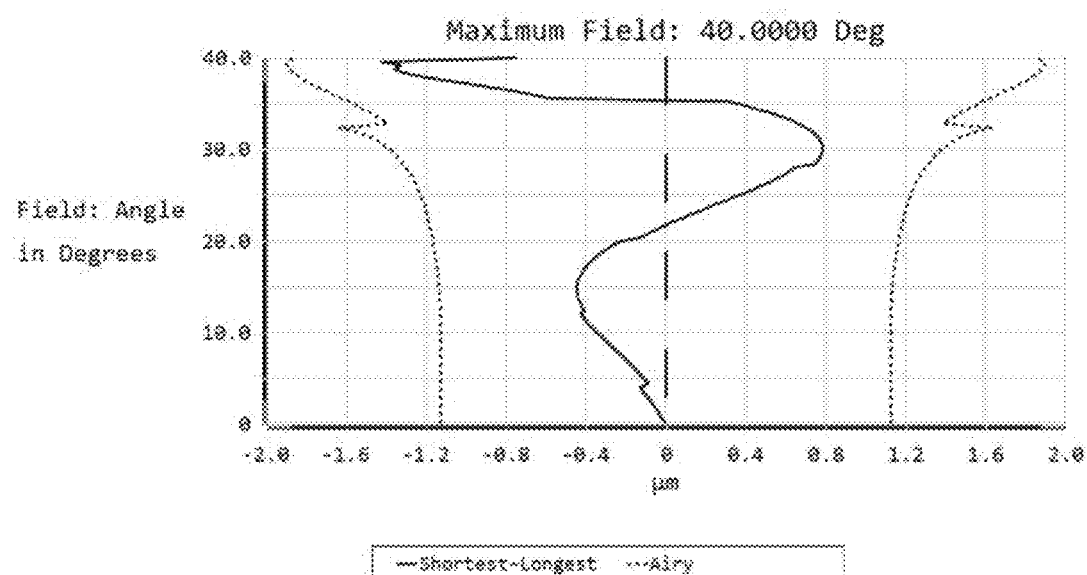
FIG. 6 is a diagram showing lateral chromatic aberration curves of the optical imaging lens according to the first embodiment of the disclosure.

Please refer to FIG. 2, which is a schematic structural diagram of an imaging device 1000 provided in this embodiment. The imaging device 1000 includes the optical imaging lens 100 as described above and an imaging component 200 configured for converting an optical image formed by the optical imaging lens 100 into electrical signal. As an embodiment, the imaging component 200 is arranged at the image side of the optical imaging lens 100, and a light sensing surface (the surface of the imaging component 200 facing the optical imaging lens 100) may coincide with the imaging surface P to achieve clear imaging. In some embodiments, the imaging component 200 may be a photoelectric sensor, such as a charge coupled device (CCD), a complementary metal oxide semiconductor (CMOS) and the like.

As an embodiment, the imaging device 1000 can be applied in optical imaging systems such as a vehicle imaging system, a monitoring imaging system and the like.

Figure 1B:
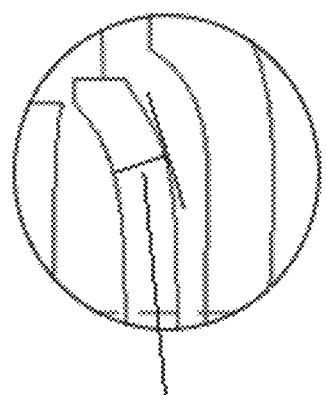
FIG. 1B is a partially enlarged diagram of FIG. 1, showing an example of $CT_{4-i}$.

Further, in some embodiments, the optical imaging lens 100 meets the expressions:

$$0.7 < CT_{4-i}/CT_4 < 1.2;$$

$$0.7 < CT_{5-i}/CT_5 < 1.2;$$

where $CT_{4-i}$ represents a thickness of the fourth lens L4 at any position in the normal direction (the normal refers to a line perpendicular to a tangent line at any position of an aspheric curve), 4-i refers to any position of the image side surface S8 of the fourth lens L4, $CT_{5-i}$ represents a thickness of the fifth lens L5 at any position in the normal direction, 5-i refers to any position of the image side surface S10 of the fifth lens L5, $CT_4$ represents a center thickness of the fourth lens L4, $CT_5$ represents a center thickness of the fifth lens L5. FIG. 1B is a partially enlarged view of FIG. 1, and shows an example of $CT_{4-i}$, corresponding to one point on the image side surface S8 of the fourth lens L4. The values of $CT_{4-i}/CT_4$ and $CT_{5-i}/CT_5$ are greater than 0.7, which is beneficial for the molding of the fourth lens L4 and the fifth lens L5. The fourth lens L4 and the fifth lens L5 are not prone to high-order aberrations for off-axis light and have stable performance. The values of $CT_{4-i}/CT_4$ and $CT_{5-i}/CT_5$ are less than 1.2, which reduces the difficulty in correcting field curvature and coma. That is, when the values of $CT_{4-i}/CT_4$ and $CT_{5-i}/CT_5$ are within the range of the above-mentioned expressions, the fourth lens L4 and the fifth lens L5 have uniform thicknesses at any position and are easily molded.

Further, in some embodiments, the optical imaging lens 100 meets the expression:

$$25 < (R_9/CT_5) + (R_{10}/CT_5) < 35;$$

where $R_9$ represents a radius of curvature of the object side surface S9 of the fifth lens L5, $R_{10}$ represents a radius of curvature of the image side surface S10 of the fifth lens L5, $CT_5$ represents a center thickness of the fifth lens L5. The value of $(R_9/CT_5)+(R_{10}/CT_5)$ is larger than 25, which makes the fifth lens L5 is not prone to high-order aberrations for off-axis light and has stable performance. The value of $(R_9/CT_5)+(R_{10}/CT_5)$ is less than 35, which reduces the difficulty of correcting field curvature and coma, and effectively avoids the increase of eccentricity sensitivity.

Further, in some embodiments, the optical imaging lens 100 meets the expression:

$$0<R_7/R_8<0.5;$$

where $R_7$ represents a radius of curvature of the object side surface S7 of the fourth lens L4, $R_8$ represents a radius of curvature of the image side surface S8 of the fourth lens L4. The value of $R_7/R_8$ is greater than 0, it can effectively avoid the increase of the refractive power of the fourth lens L4, is helpful to ensure the peripheral performance, and can avoid the increase of the eccentricity sensitivity. The value of $R_7/R_8$ is less than 0.5, which reduces the difficulty of correcting the field curvature.

Further, in some embodiments, the optical imaging lens 100 meets the expression:

$$5.0<(T_{12}/T_{23})+(T_{34}/T_{45})+(T_{56}/T_{67})<7.0;$$

where $T_{12}$ represents a distance between the first lens L1 and the second lens L2 on the optical axis A, $T_{23}$ represents a distance between the second lens L2 and the third lens L3 on the optical axis A, $T_{34}$ represents a distance between the third lens L3 and the fourth lens L4 on the optical axis A, $T_{45}$ represents a distance between the fourth lens L4 and the fifth lens L5 on the optical axis A, $T_{56}$ represents a distance between the fifth lens L5 and the sixth lens L6 on the optical axis A, $T_{67}$ represents a distance between the sixth lens L6 and the seventh lens L7 on the optical axis A. Satisfying the above expression, a total optical length of the optical imaging lens 100 is effectively shortened, and the miniaturization of the optical imaging lens 100 can be promoted.

Further, in some embodiments, the optical imaging lens 100 meets the expressions:

$$T_{23}<T_{12}<T_{34};$$

$$T_{45}<T_{34};$$

$$T_{45}<T_{67}<T_{56}.$$

Further, in some embodiments, the optical imaging lens 100 meets the expressions:

$$D_1>D_2>D_3;$$

$$D_7>D_6>D_5>D_4;$$

where $D_1$ represents the maximum diameter of the first lens, $D_2$ represents the maximum diameter of the second lens, $D_3$ represents the maximum diameter of the third lens, $D_4$ represents the maximum diameter of the fourth lens, $D_5$ represents the maximum diameter of the fifth lens, $D_6$ represents the maximum diameter of the sixth lens. $D_7$ represents the maximum diameter of the seventh lens.

Further, in some embodiments, the optical imaging lens 100 meets the expression:

$$1.0<Td/ImgH<1.5;$$

where Td represents a distance between the object side surface S of the first lens L and the image side surface S14 of the seventh lens L7 on the optical axis A, ImgH represents a half image height of the optical imaging lens 100 on the imaging surface P. Satisfying the above expression, a total optical length of the optical imaging lens 100 is effectively shortened, and the miniaturization of the optical imaging lens 100 can be promoted.

Further, in some embodiments, the optical imaging lens 100 meets the expression:

$$1.0<f_1/f<1.5;$$

where $f_1$ represents a focal length of the first lens L1, f represents a focal length of the optical imaging lens 100. The value of $f_1/f$ is greater than 1.0, which avoids the increase of the refractive power and the eccentricity sensitivity of the first lens L1. The value of $f_1/f$ is less than 1.5, it can avoid the decrease of the refractive power of the first lens L1, and is conducive to maintain the miniaturization of the optical imaging lens 100.

Further, in some embodiments, the optical imaging lens 100 meets the expression:

$$0<f_5/f_4<10;$$

where $f_4$ represents a focal length of the fourth lens L4, $f_5$ represents a focal length of the fifth lens L5. The value of $f_5/f_4$ is greater than 0, the field curvature and the distortion can be prevented from increasing excessively in a negative direction, thereby reducing the difficulty of correcting. The value of $f_5/f_4$ is less than 10, the field curvature and the distortion can be prevented from increasing excessively in a positive direction, thereby reducing the difficulty of correcting.

Further, as an embodiment, when every lens of the optical imaging lens 100 is an aspheric lens, every aspheric surface of the optical imaging lens 100 may meet the following expression:

$$z = \frac{ch^2}{1+\sqrt{1-(1+k)c^2h^2}} + \sum A_{2i}h^{2i},$$

where h represents a height of a point on an aspheric surface, z represents a vector height between the point whose height is h and a vertex of the aspheric surface along the optical axis A, c represents a paraxial curvature radius of the aspheric surface, k represents a conic coefficient, and $A_{2i}$ represents a 2i-th order aspherical surface coefficient.

By appropriately setting the shape and the refractive power of the first lens L1, the second lens L2, the third lens L3, the fourth lens L4, the fifth lens L5, the sixth lens L6 and the seventh lens L7, the optical imaging lens 100 and the imaging device 1000 provided by the embodiments of the disclosure effectively reduce the overall size of the optical imaging lens 100, and achieve clear imaging effect with large aperture. In some embodiments, one glass lens and six plastic lenses are adopted in the optical imaging lens 100. It is small in size, compact in structure, has a large aperture, can provide better optical imaging quality, and is suitable for various portable electronic devices, vehicle-mounted devices, and monitoring devices.

Refer to FIG. 3, FIG. 4, FIG. 5 and FIG. 6, in this embodiment, the curves of the field curvature, the distortion, the axial spherical aberration and the lateral chromatic aberration are shown in FIG. 3, FIG. 4, FIG. 5 and FIG. 6, respectively. From these figures, it is apparent that the field curvature, the distortion and the chromatic aberration can be well corrected in this embodiment.

Specifically, design parameters of the optical imaging lens 100 provided in this embodiment are shown in Table 1:

TABLE 1

| | Surface No. | Radius of curvature | Thickness | Refractivity | Abbe number |
|---|---|---|---|---|---|
| | Object side surface | — | 800.000 | | |
| | Stop S0 | — | −0.602 | | |
| First lens L1 | S1 | 1.996 | 0.731 | 1.652 | 62.219 |
| | S2 | 3.340 | 0.165 | | |
| Second lens L2 | S3 | 2.670 | 0.194 | 1.661 | 20.373 |
| | S4 | 1.949 | 0.069 | | |
| Third lens L3 | S5 | 3.272 | 0.490 | 1.544 | 55.951 |
| | S6 | 18.556 | 0.420 | | |
| Fourth lens L4 | S7 | −10.394 | 0.301 | 1.661 | 20.373 |
| | S8 | −43.528 | 0.165 | | |
| Fifth lens L5 | S9 | 6.207 | 0.377 | 1.661 | 20.373 |
| | S10 | 5.684 | 0.375 | | |
| Sixth lens L6 | S11 | 5.785 | 0.781 | 1.544 | 55.951 |
| | S12 | −1.992 | 0.252 | | |
| Seventh lens L7 | S13 | −1.797 | 0.441 | 1.535 | 55.664 |
| | S14 | 3.780 | 0.200 | | |
| Filter G | S15 | — | 0.210 | 1.517 | 64.167 |
| | S16 | — | 0.578 | | |
| | Imaging surface P | — | — | | |

Aspherical parameters of every lens in the optical imaging lens 100 are shown in Table 2.

TABLE 2

| Surface No. | k | $A_4$ | $A_6$ | $A_8$ | $A_{10}$ | $A_{12}$ |
|---|---|---|---|---|---|---|
| S1 | 0.000 | −6.04E−06 | 4.47E−03 | −5.98E−03 | 4.86E−03 | −1.93E−03 |
| S2 | 4.261 | −3.19E−02 | 1.52E−02 | −2.50E−02 | 2.14E−02 | −1.03E−02 |
| S3 | −8.802 | −6.05E−02 | 2.41E−02 | −7.64E−03 | 1.47E−02 | −1.18E−02 |
| S4 | −5.579 | −1.65E−02 | −1.15E−02 | 3.43E−02 | 3.52E−02 | 2.27E−02 |
| S5 | 4.781 | −1.74E−02 | −1.91E−03 | −2.18E−02 | 5.52E−03 | 1.14E−02 |
| S6 | 19.877 | −8.22E−03 | 1.14E−02 | −1.70E−02 | 2.29E−03 | 2.27E−02 |
| S7 | 68.594 | −4.98E−02 | −4.49E−02 | 5.47E−02 | −7.44E−02 | 5.58E−02 |
| S8 | 100.003 | −8.50E−02 | −1.29E−02 | −1.60E−02 | −5.57E−03 | 7.83E−03 |
| S9 | −99.705 | −7.52E−02 | 4.69E−02 | −2.78E−02 | 8.82E−04 | 6.58E−04 |
| S10 | −81.558 | −7.45E−02 | 4.24E−02 | −1.76E−02 | 3.64E−03 | −4.79E−04 |
| S11 | −76.733 | −5.77E−03 | −8.09E−03 | −1.94E−03 | 9.26E−04 | −1.01E−04 |
| S12 | −2.606 | 9.06E−02 | −3.14E−02 | 3.07E−03 | 1.06E−04 | −1.47E−05 |
| S13 | −6.698 | −2.05E−02 | 6.33E−03 | −4.90E−04 | −1.20E−05 | 1.91E−06 |
| S14 | 0.212 | −6.70E−02 | 1.99E−02 | −5.40E−03 | 9.60E−04 | −1.03E−04 |

| Surface No. | $A_{14}$ | $A_{16}$ | $A_{18}$ | $A_{20}$ | $A_{22}$ | $A_{24}$ |
|---|---|---|---|---|---|---|
| S1 | 3.30E−04 | 0.00E+00 | — | — | — | — |
| S2 | 1.97E−03 | 0.00E+00 | — | — | — | — |
| S3 | 3.22E−03 | −2.87E−05 | — | — | — | — |
| S4 | −5.40E−03 | −1.73E−04 | — | — | — | — |
| S5 | −4.58E−03 | −1.14E−05 | — | — | — | — |
| S6 | −2.15E−02 | 6.90E−03 | — | — | — | — |
| S7 | −1.95E−02 | 1.96E−03 | −1.01.E−03 | 1.28E−03 | −1.80E−04 | 2.00E−05 |
| S8 | −3.81E−04 | −1.08E−04 | −3.44E−04 | −1.83E−04 | 1.64E−04 | 2.48E−06 |
| S9 | 1.22E−03 | −1.76E−04 | −3.56E−04 | 9.69E−05 | −1.04E−06 | 1.39E−06 |
| S10 | 4.97E−05 | 1.25E−06 | 9.82E−07 | −4.38E−07 | −2.44E−09 | −5.35E−09 |
| S11 | −1.30E−06 | −9.21E−08 | 1.54E−07 | 5.55E−08 | 5.39E−09 | −2.44E−09 |
| S12 | −3.42E−06 | 1.07E−07 | 2.39E−08 | 5.18E−08 | −1.40E−08 | 1.09E−09 |
| S13 | 1.53E−07 | −2.97E−09 | 1.48E−11 | −1.95E−10 | −3.57E−12 | 1.29E−12 |
| S14 | 5.59E−06 | −6.77E−08 | −1.94E−09 | −1.49E−10 | −9.73E−12 | 9.37E−13 |

Embodiment 2

The structure diagram of the optical imaging lens 100 provided in this embodiment is substantially similar to that of the first embodiment, except that design parameters of every lens are different.

Figure 7:
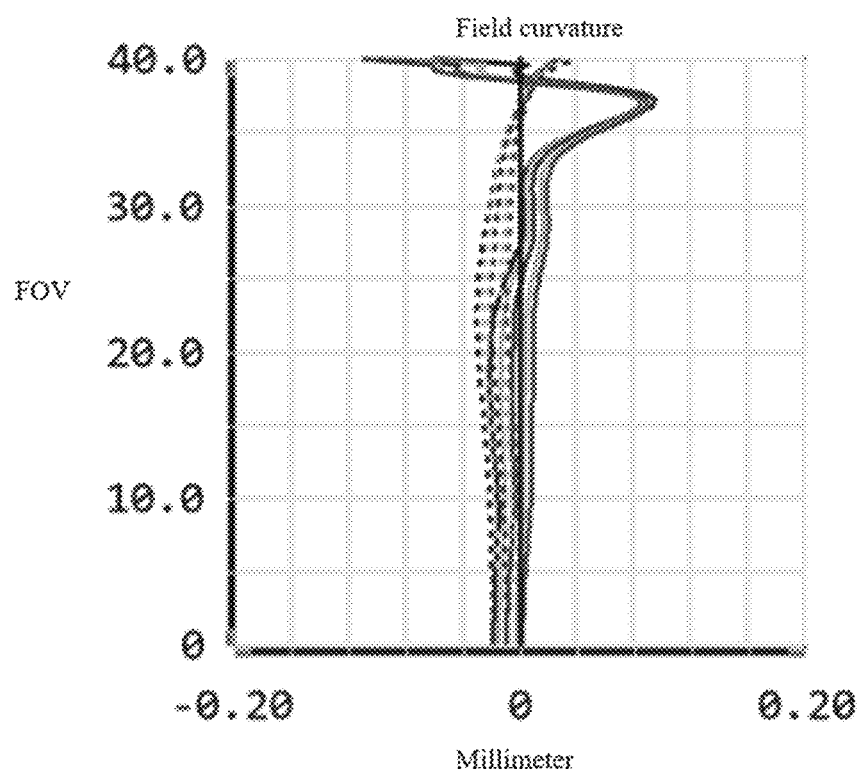
FIG. 7 is a diagram showing field curvature curves of the optical imaging lens according to a second embodiment of the disclosure.
Figure 8:
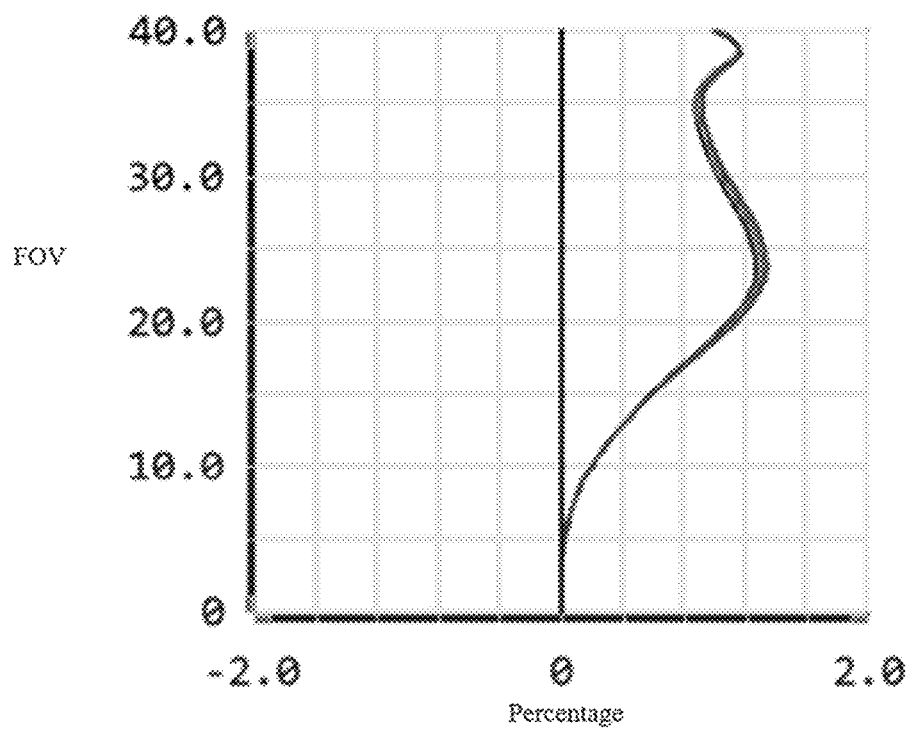
FIG. 8 is a diagram showing distortion curves of the optical imaging lens according to the second embodiment of the disclosure.
Figure 9:
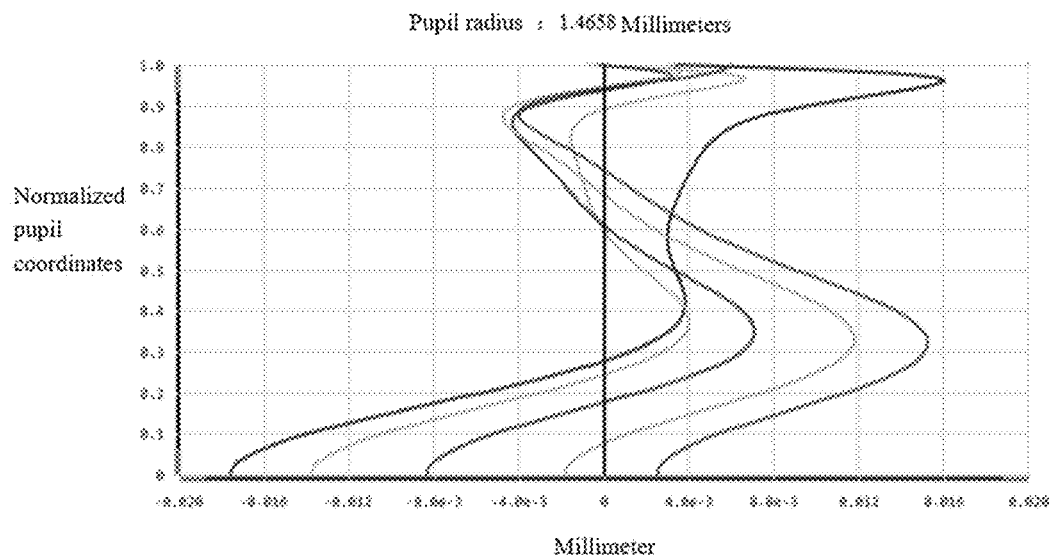
FIG. 9 is a diagram showing axial spherical aberration curves of the optical imaging lens according to the second embodiment of the disclosure.
Figure 10:
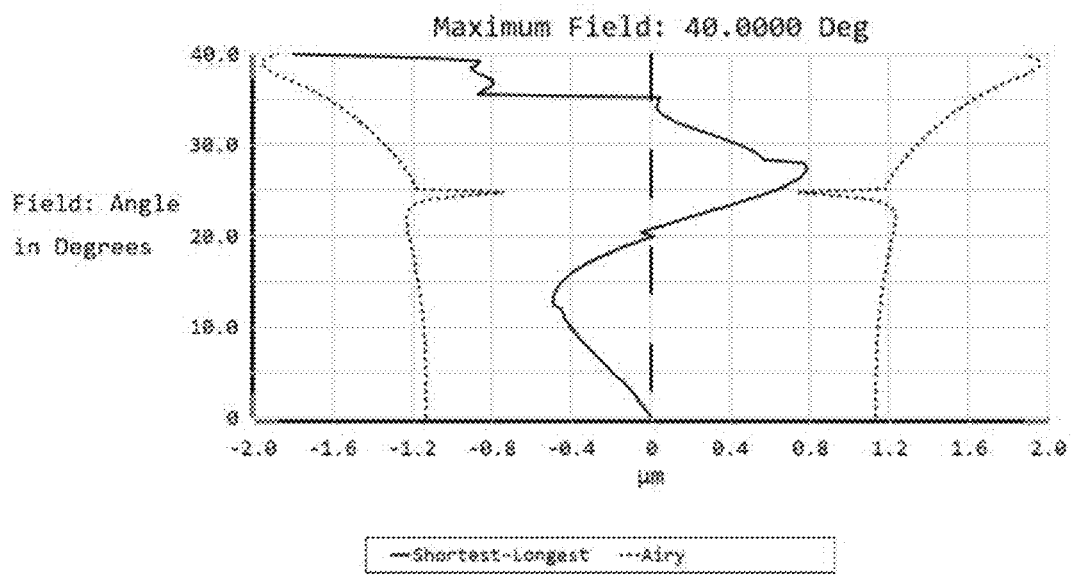
FIG. 10 is a diagram showing lateral chromatic aberration curves of the optical imaging lens according to the second embodiment of the disclosure.

Refer to FIG. 7, FIG. 8. FIG. 9 and FIG. 10, in this embodiment, the curves of the field curvature, the distortion, the axial spherical aberration and the lateral chromatic aberration are shown in FIG. 7. FIG. 8, FIG. 9 and FIG. 10, respectively. From these figures, it is apparent that the field curvature, the distortion and the chromatic aberration can be well corrected in this embodiment.

Specifically, the design parameters of the optical imaging lens 100 provided in this embodiment are shown in Table 3:

TABLE 3

| | Surface No. | Radius of curvature | Thickness | Refractivity | Abbe number |
|---|---|---|---|---|---|
| | Object side surface | — | 800.000 | | |
| | Stop S0 | — | −0.641 | | |
| First lens L1 | S1 | 1.984 | 0.746 | 1.652 | 62.219 |
| | S2 | 3.355 | 0.158 | | |
| Second lens L2 | S3 | 2.844 | 0.196 | 1.661 | 20.373 |
| | S4 | 2.025 | 0.063 | | |

TABLE 3-continued

| | Surface No. | Radius of curvature | Thickness | Refractivity | Abbe number |
|---|---|---|---|---|---|
| Third lens L3 | S5 | 3.439 | 0.515 | 1.544 | 55.951 |
| | S6 | 24.342 | 0.419 | | |
| Fourth lens L4 | S7 | −9.904 | 0.311 | 1.661 | 20.373 |
| | S8 | −30.950 | 0.209 | | |
| Fifth lens L5 | S9 | 5.658 | 0.368 | 1.661 | 20.373 |
| | S10 | 5.021 | 0.348 | | |
| Sixth lens L6 | S11 | 5.224 | 0.774 | 1.544 | 55.951 |
| | S12 | −2.099 | 0.258 | | |
| Seventh lens L7 | S13 | −1.758 | 0.379 | 1.535 | 55.664 |
| | S14 | 4.186 | 0.200 | | |
| Filter G | S15 | — | 0.210 | 1.517 | 64.167 |
| | S16 | — | 0.598 | | |
| Imaging surface P | | — | | | |

Aspherical parameters of every lens in the optical imaging lens 100 are shown Table 4.

TABLE 4

| Surface No. | k | $A_4$ | $A_6$ | $A_8$ | $A_{10}$ | $A_{12}$ |
|---|---|---|---|---|---|---|
| S1 | 0.000 | 5.26E−04 | 5.10E−03 | −5.75E−03 | 4.54E−03 | −1.79E−03 |
| S2 | 4.349 | −2.07E−02 | 1.07E−02 | −2.47E−02 | 2.30E−02 | −1.17E−02 |
| S3 | −4.600 | −6.01E−02 | 1.60E−02 | −7.13E−03 | 1.56E−02 | −1.18E−02 |
| S4 | −3.352 | −2.14E−02 | −1.31E−02 | 3.22E−02 | −3.53E−02 | 2.32E−02 |
| S5 | 5.377 | −5.35E−03 | −3.34E−03 | −1.82E−02 | 3.04E−03 | 1.10E−02 |
| S6 | 100.000 | −9.05E−03 | 7.96E−03 | −9.68E−03 | −4.19E−04 | 2.12E−02 |
| S7 | 62.081 | −5.19E−02 | −3.76E−02 | 4.89E−02 | −7.11E−02 | 5.46E−02 |
| S8 | 99.876 | −8.09E−02 | 9.44E−03 | −1.17E−02 | −6.89E−03 | 6.98E−03 |
| S9 | −98.505 | −6.14E−02 | 3.44E−02 | −2.20E−02 | 1.45E−03 | −3.65E−04 |
| S10 | −59.136 | −7.84E−02 | 4.49E−02 | −1.83E−02 | 3.61E−03 | −4.23E−04 |
| S11 | −34.970 | −1.92E−02 | −1.89E−03 | −2.69E−03 | 9.03E−04 | −8.86E−05 |
| S12 | −2.911 | 8.94E−03 | −2.97E−02 | 3.05E−03 | 5.99E−05 | −1.84E−05 |
| S13 | −5.822 | −1.26E−02 | 5.19E−03 | −4.51E−04 | −9.09E−06 | 1.43E−06 |
| S14 | 0.438 | −6.36E−02 | 1.95E−02 | −5.60E−03 | 1.01E−03 | −1.04E−04 |

| Surface No. | $A_{14}$ | $A_{16}$ | $A_{18}$ | $A_{10}$ | $A_{22}$ | $A_{24}$ |
|---|---|---|---|---|---|---|
| S1 | 3.31E−04 | 0.00E+00 | — | — | — | — |
| S2 | 2.31E−03 | 0.00E+00 | — | — | — | — |
| S3 | 2.92E−03 | 3.68E−05 | — | — | — | — |
| S4 | −5.61E−03 | −2.41E−05 | — | — | — | — |
| S5 | −4.22E−03 | 8.16E−05 | — | — | — | — |
| S6 | −2.04E−02 | 6.74E−03 | — | — | — | — |
| S7 | −2.06E−02 | 2.10E−03 | −3.33E−04 | 1.05E−03 | −1.89E−04 | 0.00E+00 |
| S8 | −3.98E−04 | 1.24E−05 | −2.56E−04 | −1.77E−04 | 1.41E−04 | 0.00E+00 |
| S9 | 1.02E−03 | −6.81E−05 | −2.63E−04 | 7.33E−05 | 0.00E+00 | 0.00E+00 |
| S10 | 5.25E−05 | −1.93E−06 | 2.79E−07 | −2.48E−07 | 0.00E+00 | 0.00E+00 |
| S11 | 2.07E−08 | −5.53E−07 | 5.95E−08 | 3.27E−08 | 5.32E−09 | −1.21E−09 |
| S12 | −2.99E−06 | 9.49E−09 | 3.06E−08 | 5.15E−08 | −1.38E−08 | 1.00E−09 |
| S13 | 1.58E−07 | 2.58E−09 | −7.55E−10 | −1.10E−10 | −3.99E−12 | 9.03E−13 |
| S14 | 5.37E−06 | −6.95E−08 | −1.66E−09 | −1.06E−10 | −5.74E−12 | 6.31E−13 |

Embodiment 3

The structure diagram of the optical imaging lens 100 provided in this embodiment is substantially similar to that of the first embodiment, except that design parameters of every lens are different.

Figure 11:
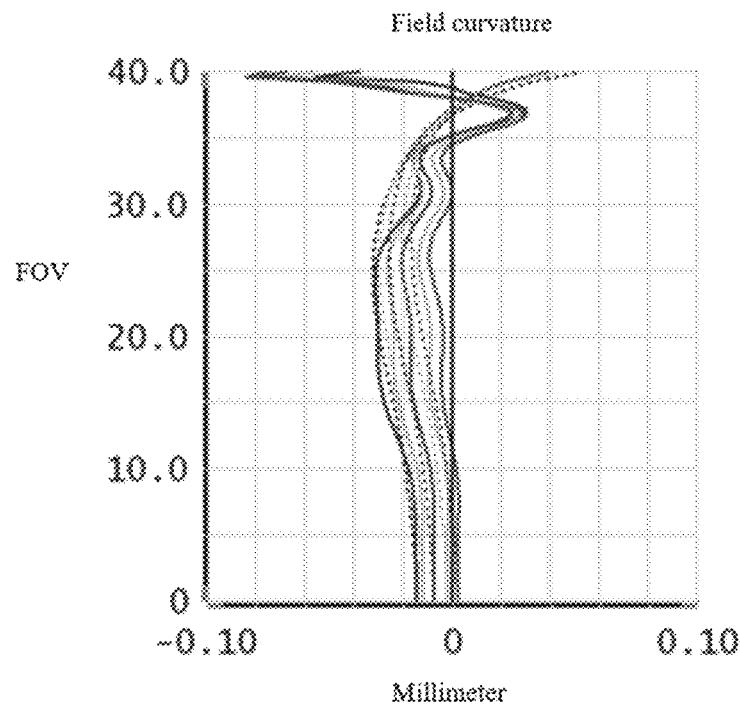
FIG. 11 is a diagram showing field curvature curves of the optical imaging lens according to a third embodiment of the disclosure.
Figure 12:
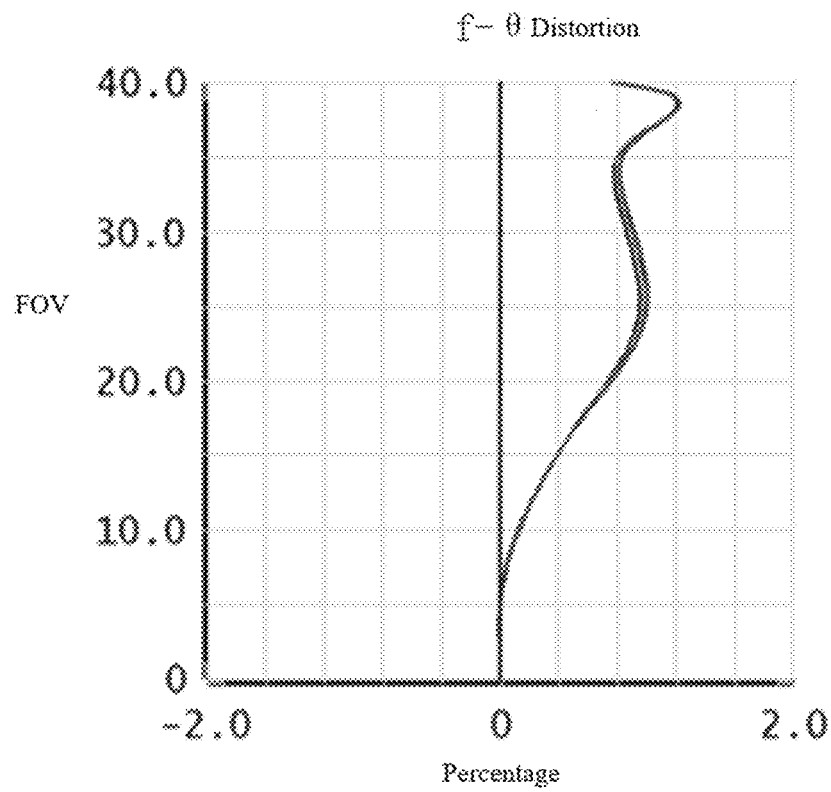
FIG. 12 is a diagram showing distortion curves of the optical imaging lens according to the third embodiment of the disclosure.
Figure 13:
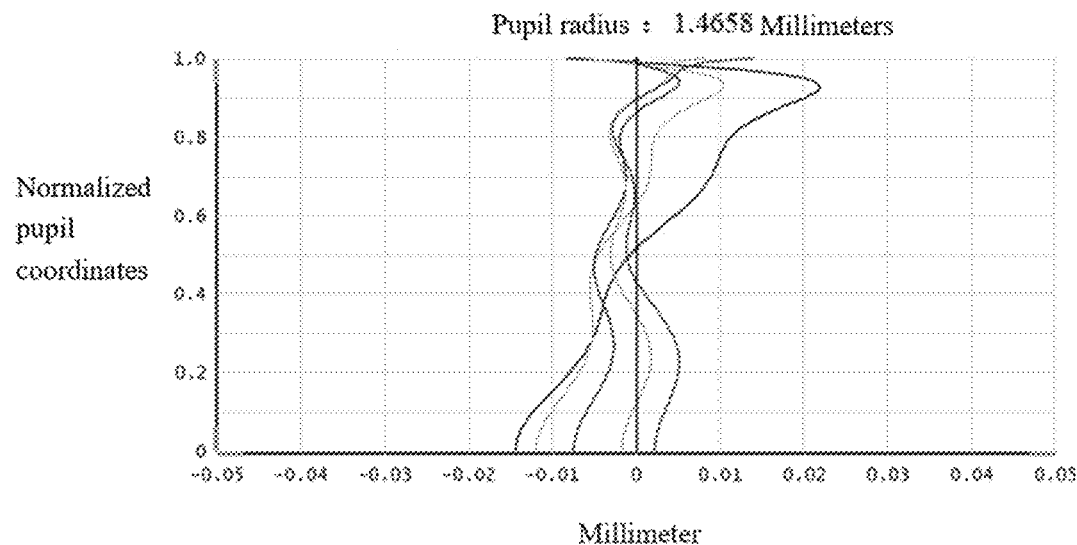
FIG. 13 is a diagram showing axial spherical aberration curves of the optical imaging lens according to the third embodiment of the disclosure.
Figure 14:
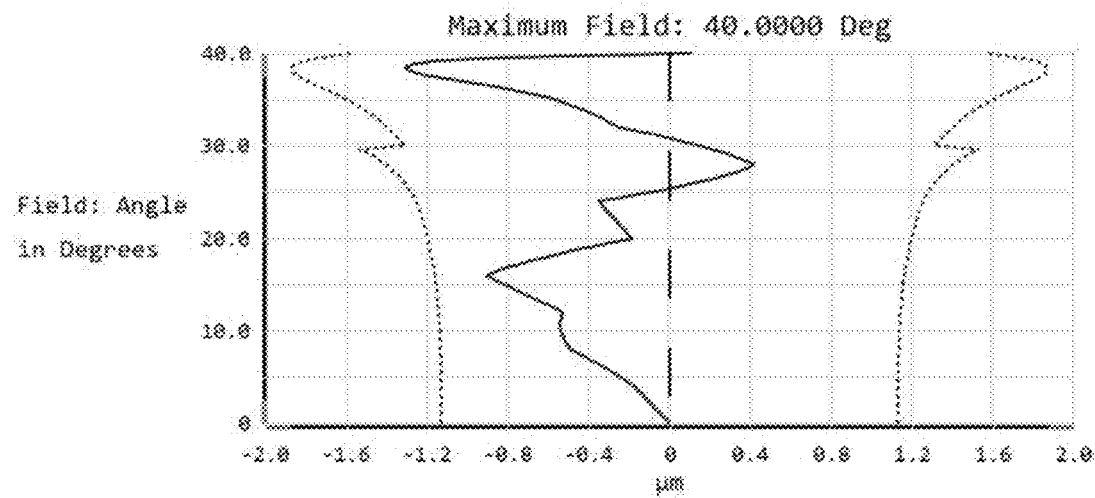
FIG. 14 is a diagram showing lateral chromatic aberration curves of the optical imaging lens according to the third embodiment of the disclosure.

Refer to FIG. 11, FIG. 12, FIG. 13 and FIG. 14, in this embodiment, the curves of the field curvature, the distortion, the axial spherical aberration and the lateral chromatic aberration are shown in FIG. 11. FIG. 12. FIG. 13 and FIG. 14, respectively. From these figures, it is apparent that the field curvature, the distortion and the chromatic aberration can be well corrected in this embodiment.

Specifically, the design parameters of the optical imaging lens 100 provided in this embodiment are shown in Table 5:

TABLE 5

| | Surface No. | Radius of curvature | Thickness | Refractivity | Abbe number |
|---|---|---|---|---|---|
| Object side surface | | — | 800.000 | | |
| Stop S0 | | — | −0.663 | | |
| First lens L1 | S1 | 2.008 | 0.730 | 1.652 | 62.219 |
| | S2 | 3.315 | 0.161 | | |
| Second lens L2 | S3 | 2.690 | 0.195 | 1.671 | 19.243 |
| | S4 | 1.960 | 0.072 | | |
| Third lens L3 | S5 | 3.305 | 0.491 | 1.544 | 55.951 |
| | S6 | 22.366 | 0.424 | | |
| Fourth lens L4 | S7 | −10.538 | 0.308 | 1.661 | 20.373 |
| | S8 | −41.968 | 0.173 | | |
| Fifth lens L5 | S9 | 6.035 | 0.376 | 1.661 | 20.373 |
| | S10 | 5.285 | 0.358 | | |
| Sixth lens L6 | S11 | 5.603 | 0.795 | 1.544 | 55.951 |
| | S12 | −2.014 | 0.285 | | |
| Seventh lens L7 | S13 | −1.786 | 0.1.79 | 1.535 | 55.664 |
| | S14 | — | 3.843 | 0.200 | |

TABLE 5-continued

| | Surface No. | Radius of curvature | Thickness | Refractivity | Abbe number |
|---|---|---|---|---|---|
| Filter | S15 | — | 0.210 | 1.517 | 64.167 |
| | S16 | — | 0.622 | | |
| Imaging surface P | | — | | | |

Aspherical parameters of every lens in the optical imaging lens 100 are shown in Table 6.

TABLE 6

| Surface No. | k | $A_4$ | $A_6$ | $A_8$ | $A_{10}$ | $A_{12}$ |
|---|---|---|---|---|---|---|
| S1 | 0.000 | 7.29E−04 | 3.96E−03 | −5.82E−03 | 4.90E−03 | −1.91E−03 |
| S2 | 4.257 | −3.10E−02 | 1.43E−02 | −2.46E−02 | 2.17E−02 | −1.03E−02 |
| S3 | −8.816 | −6.03E−02 | 2.40E−02 | −7.81E−03 | 1.46E−02 | −1.19E−02 |
| S4 | −5.809 | −1.37E−02 | −1.18E−02 | 3.38E−02 | −3.53E−02 | 2.27E−02 |
| S5 | 4.706 | −1.75E−02 | 2.90E−03 | −2.11E−02 | 5.69E−03 | 1.14E−02 |
| S6 | 19.764 | −1.05E−02 | 1.09E−02 | −1.54E−02 | 2.30E−03 | 2.26E−02 |
| S7 | 66.964 | −4.91E−02 | −4.37E−02 | 5.60E−02 | −7.41E−02 | 5.57E−02 |
| S8 | 100.606 | −8.46E−02 | 1.35E−02 | −1.52E−02 | −5.70E−03 | 7.74E−03 |
| S9 | −100.014 | −7.58E−02 | 4.75E−02 | −2.79E−02 | 9.14E−04 | 5.78E−04 |
| S10 | −76.435 | −7.43E−02 | 4.25E−02 | −1.76E−02 | 3.64E−03 | −4.79E−04 |
| S11 | −74.114 | −7.07E−03 | −8.07E−03 | −1.91E−03 | 9.30E−04 | −1.00E−04 |
| S12 | −2.538 | 9.00E−02 | −3.15E−02 | 3.06E−03 | 1.07E−04 | −1.42E−05 |
| S13 | −6.708 | −2.05E−02 | 6.37E−03 | −4.87E−04 | −1.20E−05 | 1.89E−06 |
| S14 | 0.204 | −6.77E−02 | 2.01E−02 | −5.38E−03 | 9.60E−04 | −1.03E−04 |

| Surface No. | $A_{14}$ | $A_{16}$ | $A_{18}$ | $A_{20}$ | $A_{22}$ | $A_{24}$ |
|---|---|---|---|---|---|---|
| S1 | 3.29E−04 | 0.00E+00 | — | — | — | — |
| S2 | 1.88E−03 | 0.00E+00 | — | — | — | — |
| S3 | 3.22E−03 | −2.81E−05 | — | — | — | — |
| S4 | −5.41E−03 | −2.07E−04 | — | — | — | — |
| S5 | −4.59E−03 | 3.63E−06 | — | — | — | — |
| S6 | −2.15E−02 | 7.00E−03 | — | — | — | — |
| S7 | −1.96E−02 | 2.01E−03 | −9.40E−04 | 1.30E−03 | −1.98E−04 | −2.45E−05 |
| S8 | −3.81E−04 | −1.02E−04 | −3.45E−04 | −1.92E−04 | 1.60E−04 | 2.81E−06 |
| S9 | 1.21E−03 | −1.66E−04 | −3.49E−04 | 9.77E−05 | −1.27E−06 | 9.44E−07 |
| S10 | 4.89E−05 | 1.03E−06 | 9.55E−07 | −4.32E−07 | −2.35E−07 | −6.12E−09 |
| S11 | −1.27E−06 | −8.65E−08 | 1.55E−07 | 5.59E−08 | 5.45E−09 | −2.44E−09 |
| S12 | −3.32E−06 | −9.02E−08 | 2.57E−08 | 5.20E−08 | −1.39E−08 | 1.09E−09 |
| S13 | 1.44E−07 | −3.33E−09 | −5.96E−13 | −1.96E−10 | −3.50E−12 | 1.36E−12 |
| S14 | 5.58E−06 | −6.85E−08 | −2.00E−09 | −1.51E−10 | −9.54E−12 | 1.00E−I2 |

Embodiment 4

The structure diagram of the optical imaging lens 100 provided in this embodiment is substantially similar to that of the first embodiment, except that design parameters of every lens are different.

Figure 15:
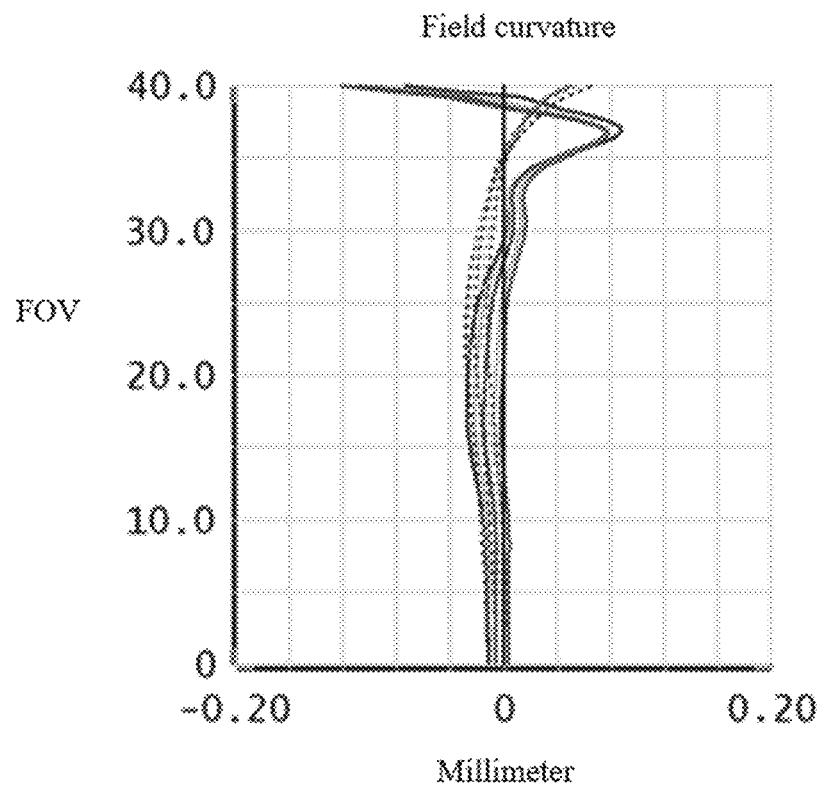
FIG. 15 is a diagram showing field curvature curves of the optical imaging lens according to a fourth embodiment of the disclosure.
Figure 16:
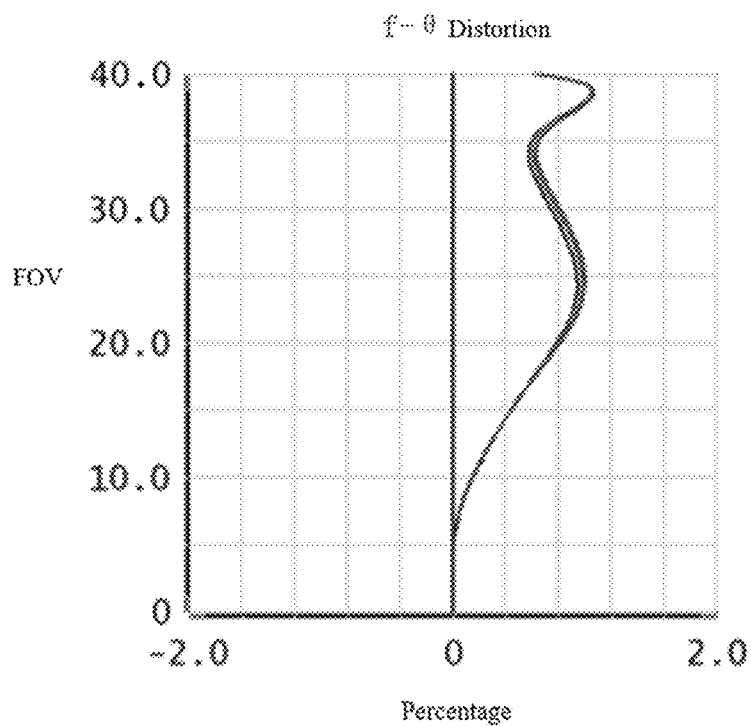
FIG. 16 is a diagram showing distortion curves of the optical imaging lens according to the fourth embodiment of the disclosure.
Figure 17:
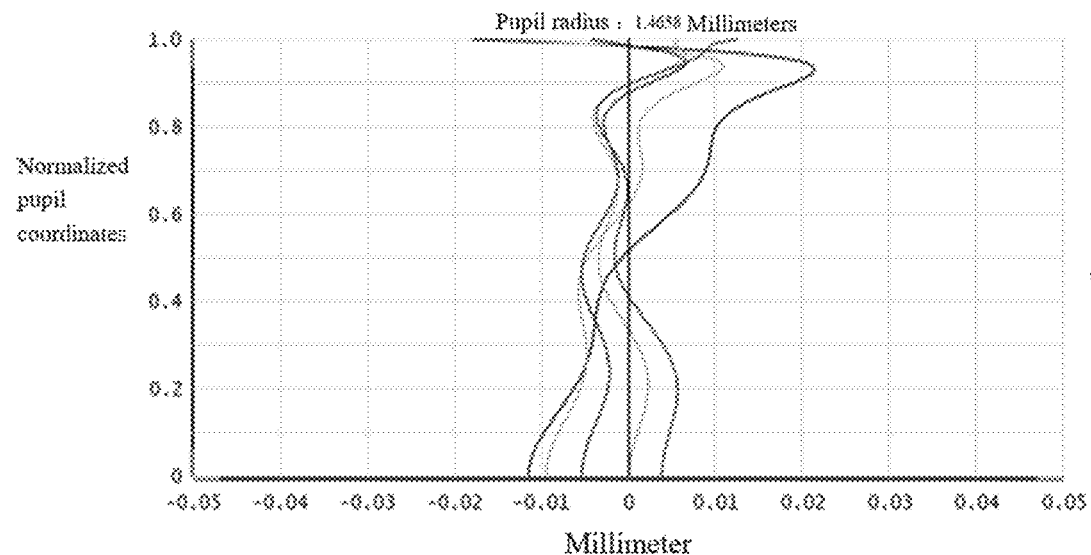
FIG. 17 is a diagram showing axial spherical aberration curves of the optical imaging lens according to the fourth embodiment of the disclosure.
Figure 18:
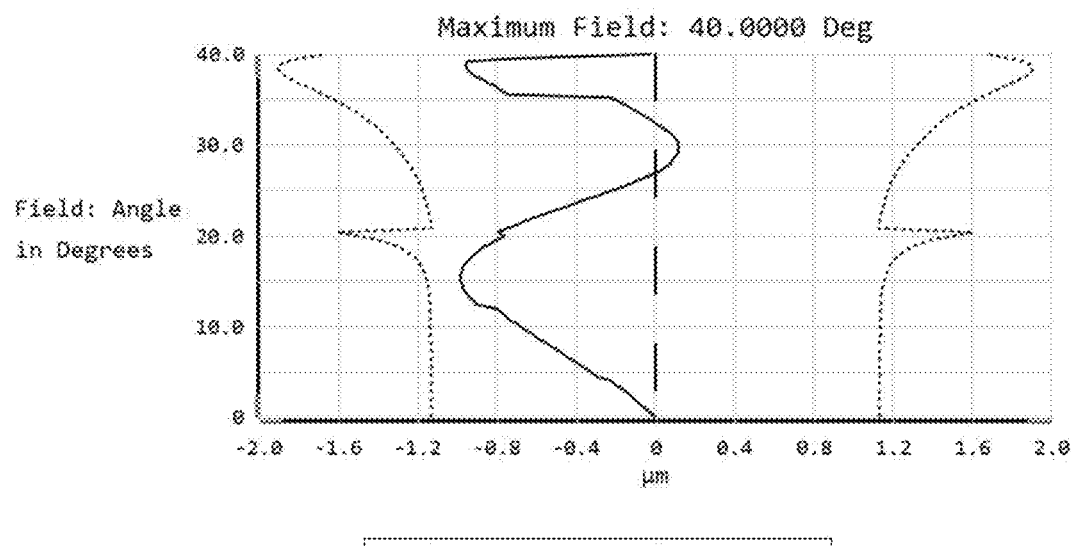
FIG. 18 is a diagram showing lateral chromatic aberration curves of the optical imaging lens according to the fourth embodiment of the disclosure.

Refer to FIG. 15, FIG. 16, FIG. 17 and FIG. 18, in this embodiment, the curves of the field curvature, the distortion, the axial spherical aberration and the lateral chromatic aberration are shown in FIG. 15. FIG. 16, FIG. 17 and FIG. 18, respectively. From these figures, it is apparent that the field curvature, the distortion and the chromatic aberration can be well corrected in this embodiment.

Specifically, the design parameters of the optical imaging lens 100 provided in this embodiment are shown in Table 7:

TABLE 7

| | Surface No. | Radius of curvature | Thickness | Refractivity | Abbe number |
|---|---|---|---|---|---|
| Object side surface | | — | 800.000 | | |
| Stop S0 | | — | −0.620 | | |
| First lens L1 | S1 | 2.008 | 0.731 | 1.652 | 62.219 |
| | S2 | 3.315 | 0.158 | | |
| Second lens L2 | S3 | 2.752 | 0.195 | 1.671 | 19.243 |
| | S4 | 1.987 | 0.070 | | |
| Third lens L3 | S5 | 3.296 | 0.475 | 1.544 | 55.951 |
| | S6 | 22.088 | 0.442 | | |
| Fourth lens L4 | S7 | −10.425 | 0.297 | 1.661 | 20.373 |
| | S8 | −40.997 | 0.183 | | |
| Fifth lens L5 | S9 | 5.771 | 0.363 | 1.661 | 20.373 |
| | S10 | 5.022 | 0.362 | | |
| Sixth lens L6 | S11 | 5.396 | 0.807 | 1.544 | 55.951 |
| | S12 | −1.992 | 0.275 | | |
| Seventh lens L7 | 513 | −1.771 | 0.380 | 1.535 | 55.664 |
| | S14 | 3.851 | 0.200 | | |
| Filter G | S15 | — | 0.210 | 1.517 | 64.167 |
| | S16 | — | 0.632 | | |
| Imaging surface P | | — | | | |

Aspherical parameters of every lens in the optical imaging lens 100 are shown in Table 8.

TABLE 8

| Surface No. | k | $A_4$ | $A_6$ | $A_8$ | $A_{10}$ | $A_{12}$ |
|---|---|---|---|---|---|---|
| S1 | 0.000 | 3.70E−04 | 4.03E−03 | −5.86E−03 | 4.87E−03 | −1.92E−03 |
| S2 | 4.258 | −3.15E−02 | 1.41E−02 | −2.48E−02 | 2.16E−02 | −1.03E−02 |
| S3 | −8.738 | −6.06E−02 | 2.39E−02 | −7.79E−03 | 1.46E−02 | −1.19E−02 |
| S4 | −5.863 | −1.41E−02 | −1.20E−02 | 3.36E−02 | −3.54E−02 | 2.27E−02 |
| S5 | 4.750 | −1.95E−02 | 2.34E−03 | −2.13E−02 | 5.61E−03 | 1.14E−02 |
| S6 | 65.258 | −1.09E−02 | 1.07E−02 | −1.54E−02 | 2.13E−03 | 2.25E−02 |
| S7 | 67.730 | −5.08E−02 | −4.52E−02 | 5.56E−02 | −7.38E−02 | 5.59E−02 |

TABLE 8-continued

| | | | | | |
|---|---|---|---|---|---|
| S8 | 100.00 | −8.58E−02 | 1.32E−02 | −1.54E−02 | −5.76E−03 | 7.71E−03 |
| S9 | −100.00 | −7.50E−02 | 4.68E−02 | −2.79E−02 | 9.87E−04 | 5.79E−04 |
| S10 | −73.060 | −7.58E−02 | 4.23E−02 | −1.76E−02 | 3.64E−03 | −4.77E−04 |
| S11 | −65.995 | −6.97E−03 | −8.09E−03 | −1.92E−03 | 9.30E−04 | −1.00E−04 |
| S12 | −2.521 | 9.01E−02 | −3.15E−02 | 3.05E−03 | 1.06E−04 | −1.44E−05 |
| S13 | −6.567 | −2.11E−02 | 6.39E−03 | −4.85E−04 | −1.21E−05 | 1.90E−06 |
| S14 | 0.208 | −6.76E−02 | 2.00E−02 | −5.38E−03 | 9.60E−04 | −1.03E−04 |

| Surface No. | $A_{14}$ | $A_{16}$ | $A_{18}$ | $A_{20}$ | $A_{22}$ | $A_{24}$ |
|---|---|---|---|---|---|---|
| S1 | 3.30E−04 | 0.00E+00 | — | — | — | — |
| S2 | 1.92E−03 | 0.00E+00 | — | — | — | — |
| S3 | 3.21E−03 | −2.63E−05 | — | — | — | — |
| S4 | −5.41E−03 | −2.03E−04 | — | — | — | — |
| S5 | −4.54E−03 | 6.14E−05 | — | — | — | — |
| S6 | −2.14E−02 | 7.15E−03 | — | — | — | — |
| S7 | −1.96E−02 | 1.93E−03 | −1.01E−03 | 1.27E−03 | −1.84E−04 | 1.18E−05 |
| S8 | −3.68E−04 | −8.73E−05 | −3.37E−04 | −1.89E−04 | 1.60E−04 | 9.83E−07 |
| S9 | 1.19E−03 | −1.72E−04 | −3.51E−04 | 9.79E−05 | −1.07E−06 | 1.18E−06 |
| S10 | 5.01E−05 | 1.33E−06 | 9.89E−07 | −4.26E−07 | −6.82E−10 | −5.98E−09 |
| S11 | −1.29E−06 | −9.20E−08 | 1.53E−07 | 5.54E−08 | 5.32E−09 | −2.47E−09 |
| S12 | −3.35E−06 | −9.51E−08 | 2.50E−08 | 5.19E−08 | −1.40E−08 | 1.09E−09 |
| S13 | 1.44E−07 | −3.29E−09 | 5.88E−12 | −1.95E−10 | −3.50E−12 | 1.33E−12 |
| S14 | 5.59E−06 | −6.84E−08 | −1.99E−09 | −1.51E−10 | −9.60E−12 | 1.00E−12 |

Refer to Table 9, Table 9 shows the corresponding optical characteristics of the optical imaging lens 100 in the above four embodiments, including the focal length f, the F number F #, the total optical length TTL, and the field of view 2θ, and related values corresponding to the aforementioned expression.

TABLE 9

| | Embodiment 1 | Embodiment 2 | Embodiment 3 | Embodiment 4 |
|---|---|---|---|---|
| f (mm) | 4.81 | 4.816 | 4.84 | 4.85 |
| F# | 1.67 | 1.67 | 1.67 | 1.67 |
| TTL (mm) | 5.75 | 5.75 | 5.75 | 5.75 |
| 2θ | 78° | 78° | 78° | 78° |
| $CT_{4\_j}/CT_4$ | 1.002 | 1.033 | 1.031 | 0.991 |
| $CT_{5\_j}/CT_5$ | 1.086 | 1.064 | 1.102 | 1.025 |
| $R_9/CT_5 + R_{10}/CT_5$ | 31.539 | 29.013 | 30.073 | 29.706 |
| $R_7/R_8$ | 0.239 | 0.32 | 0.251 | 0.754 |
| $T_{12}/T_{23} + T_{34}/T_{45} + T_{56}/T_{67}$ | 6.417 | 5.869 | 5.945 | 5.989 |
| Td/ImgH | 1.191 | 1.186 | 1.187 | 1.185 |
| $f_1/f$ | 1.299 | 1.269 | 1.317 | 1.312 |
| $f_5/f_4$ | 6.915 | 3.963 | 3.766 | 3.421 |

In each of the above embodiments, the thickness, the radius of curvature, and the material of every lens in the optical imaging lens 100 are different, and the specific differences are shown in the parameter tables of the embodiments. The above embodiments are merely preferred embodiments of the disclosure, but the disclosure is not limited only by the above embodiments. Any other changes, substitutions, combinations, or simplifications without departing from the innovation of the disclosure, should be regarded as equivalent replacement methods, which are all included in the protection scope of the disclosure.

Embodiment 5

Figure 19:
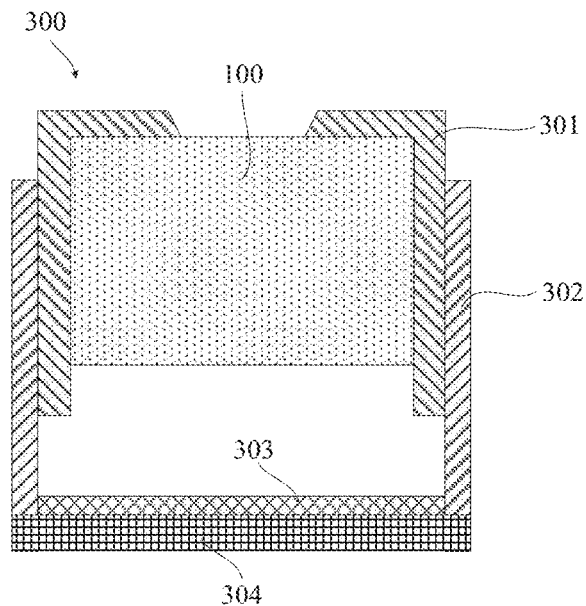
FIG. 19 is a schematic structural diagram of a camera module according to a fifth embodiment of the disclosure.

FIG. 19 illustrates a camera module 300, which includes the optical imaging lens 100 of any embodiment as described above, a barrel 301, a holder 302, an image sensor 303, and a printed circuit board 304. The optical imaging lens 100 is received in the barrel 301, and the barrel 301 is engaged with the holder 302. The image sensor 303 and the printed circuit board 304 are substantially accommodated in the holder 302. The image sensor 303 is opposite to the optical imaging lens 100 and is mounted on the printed circuit board 304. The image sensor 303 is configured for converting light signals into electrical signals, thereby the images formed by the optical imaging lens 100 can be converted and transmitted to a processor via the printed circuit board 204. The imaging component 200 as described above can be used as the image sensor 303 in this embodiment.

Embodiment 6

Figure 20:
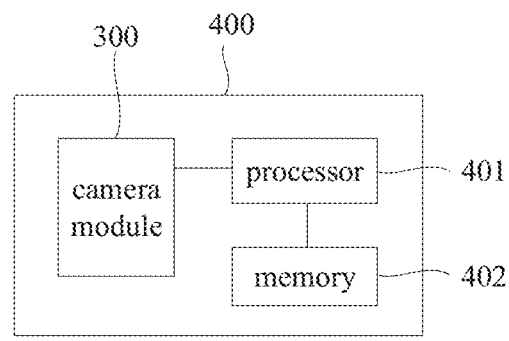
FIG. 20 is a schematic block diagram of a mobile phone according to a sixth embodiment of the disclosure.
Figure 21:
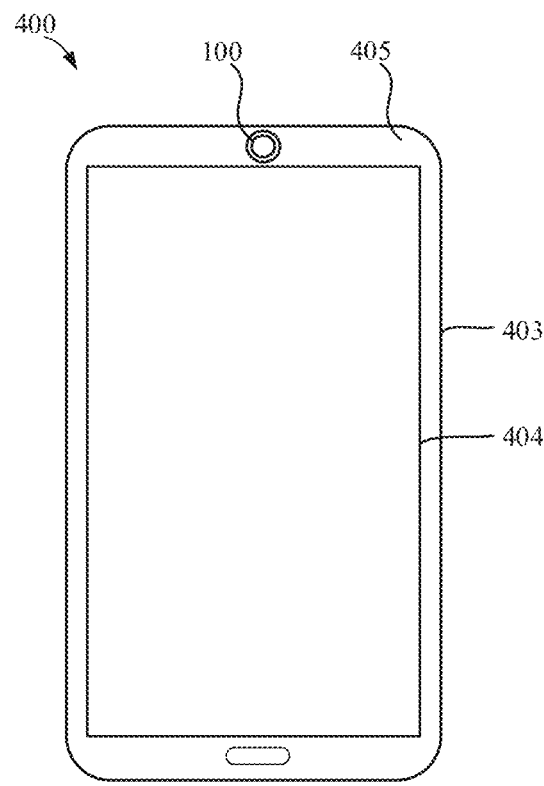
FIG. 21 is a schematic diagram of the mobile phone according to the sixth embodiment of the disclosure.

As illustrated in FIG. 20 and FIG. 21, the disclosure further provides a mobile phone 400, which includes the camera module 300 as described above, a processor 401, a memory 402, a housing 403, and a display screen 404. The camera module 300, the processor 401 and the memory 402 are received in the housing 403. The display screen 404 is engaged with the housing 403. The mobile phone 400 has a front surface 405, the camera module 300 and the display screen 404 are exposed from the front surface 405. The camera module 300 may be positioned above the display screen 404. The display screen 404 may be a touch screen. The processor 401 is communicated with the printed circuit board 304 and the memory 402, the memory 402 is configured to store the images captured by the camera module 300, and the processor 401 is configured to process the images captured by the camera module 300.

One of ordinary skill in the art understands that the mobile phone 400 also includes other components, such as an antenna, a battery, a memory, an I/O module and so on.

Embodiment 7

Figure 22:
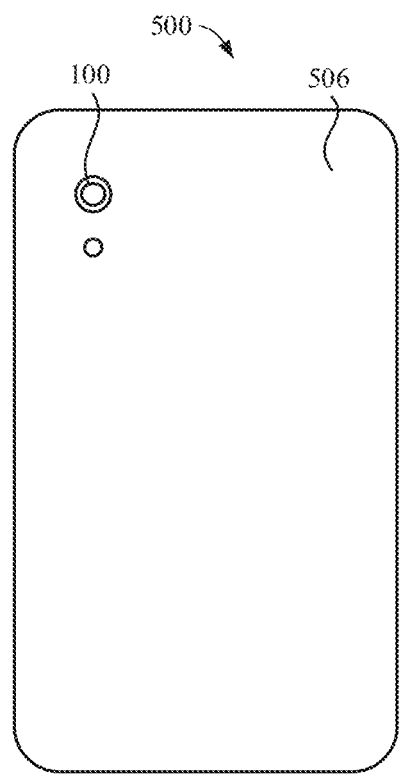
FIG. 22 is a schematic diagram of a mobile phone according to a seventh embodiment of the disclosure.

As illustrated in FIG. 22, the disclosure further provides a mobile phone 500, the mobile phone 500 includes the camera module 300 as described above, and the camera module 300 is exposed from a rear surface 506 of the mobile phone 500.

In summary, by appropriately setting the shape and the refractive power of every lens, the optical imaging lens, the imaging device, the camera module and the mobile phone provided by the embodiments of the disclosure effectively reduce the overall size of the optical imaging lens, and achieve clear imaging effect with large aperture while achieving miniaturization, so it has the advantages of miniaturization, large aperture and high imaging quality, has good applicability to portable electronic devices, and can effectively improve the user's shooting experience.

It should be noted that the above embodiments are only used to explain the technical solutions of the disclosure, but not limited thereto. Although the disclosure has been described in detail with reference to the foregoing embodiments, those skilled in the art should understand that the technical solutions described in the foregoing embodiments also can be modified, or e some of the technical features thereof can be equivalently replaced; and these modifications or replacements do not make the essence of the corresponding technical solutions deviate from the spirit and scope of the technical solutions of the embodiments of the disclosure.

What is claimed is:

1. An optical imaging lens, from an object side to an image side along an optical axis, the optical imaging lens sequentially comprising:
    a first lens with a positive refractive power, wherein an object side surface of the first lens is convex, an image side surface of the first lens is concave, the first lens is a glass aspheric lens;
    a second lens with a negative refractive power;
    a third lens with a positive refractive power;
    a fourth lens with a negative refractive power, wherein an object side surface of the fourth lens is concave at the paraxial region, and an image side surface of the fourth lens is convex at the paraxial region;
    a fifth lens with a negative refractive power, an image side surface of the fifth lens being concave at the paraxial region;
    a sixth lens with a positive refractive power;
    a seventh lens with a negative refractive power, an object side surface and an image side surface of the seventh lens both being concave at the paraxial region;
    wherein the optical imaging lens meets the expressions:

$0.7 < CT_{4-i}/CT_4 < 1.2$;

$0.7 < CT_{5-i}/CT_5 < 1.2$;

$1.0 \leq f_1/f < 1.5$;

where $CT_{4-i}$ represents a thickness of the fourth lens at any position in the normal direction, $CT_{5-i}$ represents a thickness of the fifth lens at any position in the normal direction, $CT_4$ represents a center thickness of the fourth lens, $CT_5$ represents a center thickness of the fifth lens; $f_1$ represents a focal length of the first lens, f represents a focal length of the optical imaging lens.

2. The optical imaging lens as claimed in claim 1, wherein the optical imaging lens meets the expression:

$25 < (R_9/CT_5) + (R_{10}/CT_5) < 35$;

where $R_9$ represents a radius of curvature of an object side surface of the fifth lens, $R_{10}$ represents a radius of curvature of the image side surface of the fifth lens, $CT_5$ represents a center thickness of the fifth lens.

3. The optical imaging lens as claimed in claim 1, wherein the optical imaging lens meets the expression:

$0 < R_7/R_8 < 0.5$;

where $R_7$ represents a radius of curvature of the object side surface of the fourth lens, $R_8$ represents a radius of curvature of the image side surface of the fourth lens.

4. The optical imaging lens as claimed in claim 1, wherein the optical imaging lens meets the expression:

$5.0 < (T_{12}/T_{23}) + (T_{34}/T_{45}) + (T_{56}/T_{67}) < 7.0$;

where $T_{12}$ represents a distance between the first lens and the second lens on the optical axis, $T_{23}$ represents a distance between the second lens and the third lens on the optical axis, $T_{34}$ represents a distance between the third lens and the fourth lens on the optical axis, $T_{45}$ represents a distance between the fourth lens and the fifth lens on the optical axis, $T_{56}$ represents a distance between the fifth lens and the sixth lens on the optical axis, $T_{67}$ represents a distance between the sixth lens and the seventh lens on the optical axis.

5. The optical imaging lens as claimed in claim 1, wherein the optical imaging lens meets the expression:

$1.0 < Td/ImgH < 1.5$;

where Td represents a distance between the object side surface of the first lens and the image side surface of the seventh lens on the optical axis, ImgH represents a half image height of the optical imaging lens on an imaging surface.

6. The optical imaging lens as claimed in claim 1, wherein the optical imaging lens meets the expression:

$0 < f_5/f_4 < 10$;

where $f_4$ represents a focal length of the fourth lens, $f_5$ represents a focal length of the fifth lens.

7. The optical imaging lens as claimed in claim 1, wherein the second lens, the third lens, the fourth lens, the fifth lens, the sixth lens and the seventh lens each are plastic aspheric lenses.

8. The optical imaging lens as claimed in claim 1, wherein the optimal imaging lens further comprises:
    a stop disposed at an object side of the first lens, and
    a filter disposed between the seventh lens and an imaging surface.

9. The optical imaging lens as claimed in claim 1, wherein the optical imaging lens meets the expressions:

$T_{23} < T_{12} < T_{34}$;

$T_{45} < T_{34}$;

$T_{45} < T_{67} < T_{56}$;

where $T_{12}$ represents a distance between the first lens and the second lens on the optical axis, $T_{23}$ represents a distance between the second lens and the third lens on the optical axis, $T_{34}$ represents a distance between the third lens and the fourth lens on the optical axis, $T_{45}$ represents a distance between the fourth lens and the fifth lens on the optical axis, $T_{56}$ represents a distance between the fifth lens and the sixth lens on the optical axis, $T_{67}$ represents a distance between the sixth lens and the seventh lens on the optical axis.

10. The optical imaging lens as claimed in claim 1, wherein the optical imaging lens meets the expressions:

$D_1 > D_2 > D_3$;

$D_1 > D_6 > D_5 > D_4$;

where $D_1$ represents the maximum diameter of the first lens, $D_2$ represents the maximum diameter of the second lens, $D_3$ represents the maximum diameter of the third lens, $D_4$ represents the maximum diameter of the fourth lens, $D_5$ represents the maximum diameter of the fifth lens, $D_6$ represents the maximum diameter of the sixth lens, $D_7$ represents the maximum diameter of the seventh lens.

11. A camera module, comprising an optical imaging lens and an image sensor opposite to the optical imaging lens, from an object side to an image side along an optical axis, the optical imaging lens comprising:

a stop;

a first lens with a positive refractive power, wherein an object side surface of the first lens is convex, an image side surface of the first lens is concave;

a second lens with a negative refractive power;

a third lens with a positive refractive power;

a fourth lens with a negative refractive power, wherein an object side surface of the fourth lens is concave at the paraxial region, and an image side surface of the fourth lens is convex at the paraxial region;

a fifth lens with a negative refractive power, an image side surface of the fifth lens being concave at the paraxial region;

a sixth lens with a positive refractive power; and a seventh lens with a negative refractive power, an object side surface and an image side surface of the seventh lens both being concave at the paraxial region;

wherein the optical imaging lens meets the expressions:

$0.7 < CT_{4-i}/CT_4 < 1.2$;

$0.7 < CT_{5-i}/CT_5 < 1.2$;

where $CT_{4-i}$ represents a thickness of the fourth lens at any position in the normal direction, $CT_{5-i}$ represents a thickness of the fifth lens at any position in the normal direction, $CT_4$ represents a center thickness of the fourth lens, $CT_5$ represents a center thickness of the fifth lens;

wherein each of the first lens to the seventh lens is an aspheric lens.

12. The camera module as claimed in claim 11, wherein the first lens is a glass aspheric lens, each of the second lens to the seventh lens is a plastic aspheric lens.

13. The camera module as claimed in claim 11, wherein the optical imaging lens meets the expressions:

$1.0 < f_1/f < 1.5$;

$0 < f_5/f_4 < 10$;

where $f_1$ represents a focal length of the first lens, f represents a focal length of the optical imaging lens, $f_4$ represents a focal length of the fourth lens, $f_5$ represents a focal length of the fifth lens.

14. The camera module as claimed in claim 11, wherein the optical imaging lens meets the expression:

$25 < (R_9/CT_5) + (R_{10}/CT_5) < 35$;

where $R_9$ represents a radius of curvature of an object side surface of the fifth lens, $R_{10}$ represents a radius of curvature of the image side surface of the fifth lens, $CT_5$ represents a center thickness of the fifth lens.

15. The camera module as claimed in claim 11, wherein the optical imaging lens meets the expression:

$0 < R_7/R_8 < 0.5$;

where $R_7$ represents a radius of curvature of the object side surface of the fourth lens, $R_8$ represents a radius of curvature of the image side surface of the fourth lens.

16. The camera module as claimed in claim 11, wherein the optical imaging lens meets the expressions:

$5.0 < (T_{12}/T_{23}) + (T_{34}/T_{45}) + (T_{56}/T_{67}) < 7.0$;

$T_{23} < T_{12} < T_{34}$;

$T_{45} < T_{34}$;

$T_{45} < T_{67} < T_{56}$;

where $T_{12}$ represents a distance between the first lens and the second lens on the optical axis, $T_{23}$ represents a distance between the second lens and the third lens on the optical axis, $T_{34}$ represents a distance between the third lens and the fourth lens on the optical axis, $T_{45}$ represents a distance between the fourth lens and the fifth lens on the optical axis, $T_{56}$ represents a distance between the fifth lens and the sixth lens on the optical axis, $T_{67}$ represents a distance between the sixth lens and the seventh lens on the optical axis.

17. The camera module as claimed in claim 11, wherein the optical imaging lens meets the expression:

$1.0 < Td/ImgH < 1.5$;

where Td represents a distance between the object side surface of the first lens and the image side surface of the seventh lens on the optical axis, ImgH represents a half image height of the optical imaging lens on an imaging surface.

18. The camera module as claimed in claim 11, wherein the optical imaging lens meets the expressions:

$D_1 > D_2 > D_3$;

$D_7 > D_6 > D_5 > D_4$;

where $D_1$ represents the maximum diameter of the first lens, $D_2$ represents the maximum diameter of the second lens, $D_3$ represents the maximum diameter of the third lens, $D_4$ represents the maximum diameter of the fourth lens, $D_5$ represents the maximum diameter of the fifth lens, $D_6$ represents the maximum diameter of the sixth lens, $D_7$ represents the maximum diameter of the seventh lens.

19. A mobile phone, comprising a camera module, a processor, and a housing, wherein the camera module and the processor are received in the housing, the camera module is configured to capture images, the processor is configured to process the images, the camera module sequentially comprises:

a stop;

a first lens with a positive refractive power, wherein an object side surface of the first lens is convex, an image side surface of the first lens is concave;

a second lens with a negative refractive power;

a third lens with a positive refractive power;

a fourth lens with a negative refractive power, wherein an object side surface of the fourth lens is concave at the paraxial region, and an image side surface of the fourth lens is convex at the paraxial region;

a fifth lens with a negative refractive power, an image side surface of the fifth lens being concave at the paraxial region;

a sixth lens with a positive refractive power;

a seventh lens with a negative refractive power, an object side surface and an image side surface of the seventh lens both being concave at the paraxial region; and an image sensor;

wherein each of the first lens to the seventh lens is an aspheric lens;

wherein the camera module meets the expressions:

$$0.7 < CT_{4-i}/CT_4 < 1.2;$$

$$0.7 < CT_{5-i}/CT_5 < 1.2;$$

$$25 < (R_9/CT_5) + (R_{10}/CT_5) < 35;$$

$$5.0 < T_{12}/T_{23} + (T_{34}/T_{45}) + (T_{56}/T_{67}) < 7.0;$$

where $CT_{4-i}$ represents a thickness of the fourth lens at any position in the normal direction, $CT_{5-i}$ represents a thickness of the fifth lens at any position in the normal direction, $CT_4$ represents a center thickness of the fourth lens, $CT_5$ represents a center thickness of the fifth lens, $R_9$ represents a radius of curvature of an object side surface of the fifth lens, $R_{10}$ represents a radius of curvature of the image side surface of the fifth lens, $T_{12}$ represents a distance between the first lens and the second lens on an optical axis, $T_{23}$ represents a distance between the second lens and the third lens on the optical axis, $T_{34}$ represents a distance between the third lens and the fourth lens on the optical axis, $T_{45}$ represents a distance between the fourth lens and the fifth lens on the optical axis, $T_{56}$ represents a distance between the fifth lens and the sixth lens on the optical axis, $T_{67}$ represents a distance between the sixth lens and the seventh lens on the optical axis.

20. The mobile phone as claimed in claim 19, wherein the camera module comprises an optical imaging lens and wherein the camera module meets the expressions:

$$1.0 < f_1/f < 1.5;$$

$$0 < f_5/f_4 < 10;$$

$$1.0 < Td/ImgH < 1.5;$$

where $f_1$ represents a focal length of the first lens, f represents a focal length of the optical imaging lens, $f_4$ represents a focal length of the fourth lens, $f_5$ represents a focal length of the fifth lens, Td represents a distance between the object side surface of the first lens and the image side surface of the seventh lens on the optical axis, ImgH represents a half image height of the optical imaging lens on an imaging surface.

* * * * *